(12) United States Patent
Rottmann

(10) Patent No.: US 12,254,878 B1
(45) Date of Patent: Mar. 18, 2025

(54) NATURAL LANGUAGE PROCESSING AND CLASSIFICATION

(71) Applicant: Amazon Technologies, Inc., Seattle, WA (US)

(72) Inventor: Kay Rottmann, Stuttgart (DE)

(73) Assignee: Amazon Technologies, Inc., Seattle, WA (US)

( * ) Notice: Subject to any disclaimer, the term of this patent is extended or adjusted under 35 U.S.C. 154(b) by 598 days.

(21) Appl. No.: 17/539,716

(22) Filed: Dec. 1, 2021

(51) Int. Cl.
| | | |
|---|---|---|
| *G10L 15/00* | (2013.01) |
| *G10L 15/06* | (2013.01) |
| *G10L 15/18* | (2013.01) |
| *G10L 15/22* | (2006.01) |
| *G10L 15/30* | (2013.01) |
| G10L 15/16 | (2006.01) |
| G10L 25/30 | (2013.01) |

(52) U.S. Cl.
CPC ............ *G10L 15/22* (2013.01); *G10L 15/063* (2013.01); *G10L 15/18* (2013.01); *G10L 15/30* (2013.01); *G10L 15/16* (2013.01); *G10L 25/30* (2013.01)

(58) Field of Classification Search
CPC ....... G10L 15/16; G10L 19/005; G10L 19/00; G10L 25/27; G10L 25/30; G10L 15/07; G10L 15/20; G10L 15/22; G10L 15/26; G10L 15/30; G10L 15/02; G10L 15/063; G10L 15/08; G10L 15/1822; G10L 15/183; G10L 15/193; G10L 15/19; G10L 13/00; G10L 15/14; G10L 15/197; G10L 15/1815

See application file for complete search history.

(56) References Cited

U.S. PATENT DOCUMENTS 11,417,313 B2 * 8/2022 Chae .................... G10L 13/047

* cited by examiner

*Primary Examiner* — Vu B Hang
(74) *Attorney, Agent, or Firm* — Pierce Atwood LLP

(57) ABSTRACT

Techniques for understanding classification by a machine learning model are described. A system determines a portion of a user input that causes a machine learning model to classify the user input to a particular classification. The system may generate output data according to the determined portion of the user input. In some cases, the system may generate, using the determined portion, output data explaining processing performed with respect to the user input. In other cases, the system may generate output data requesting feedback. In yet other cases, the system may change a domain, an intent or other classification determined for the user input based on the determined portion.

20 Claims, 9 Drawing Sheets

NATURAL LANGUAGE PROCESSING AND CLASSIFICATION

BACKGROUND

Machine learning is a computing technique whereby a computing system can learn how to perform a specific task without explicitly being programmed to do so. Machine learning may be used to handle a number of different tasks of varying complexity. Machine learning computing may rely on trained models that are trained using training data sets. Once trained, a machine learning model may be capable of processing input data and producing output data that conforms to the function for which the model has been trained.

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding (NLU) processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
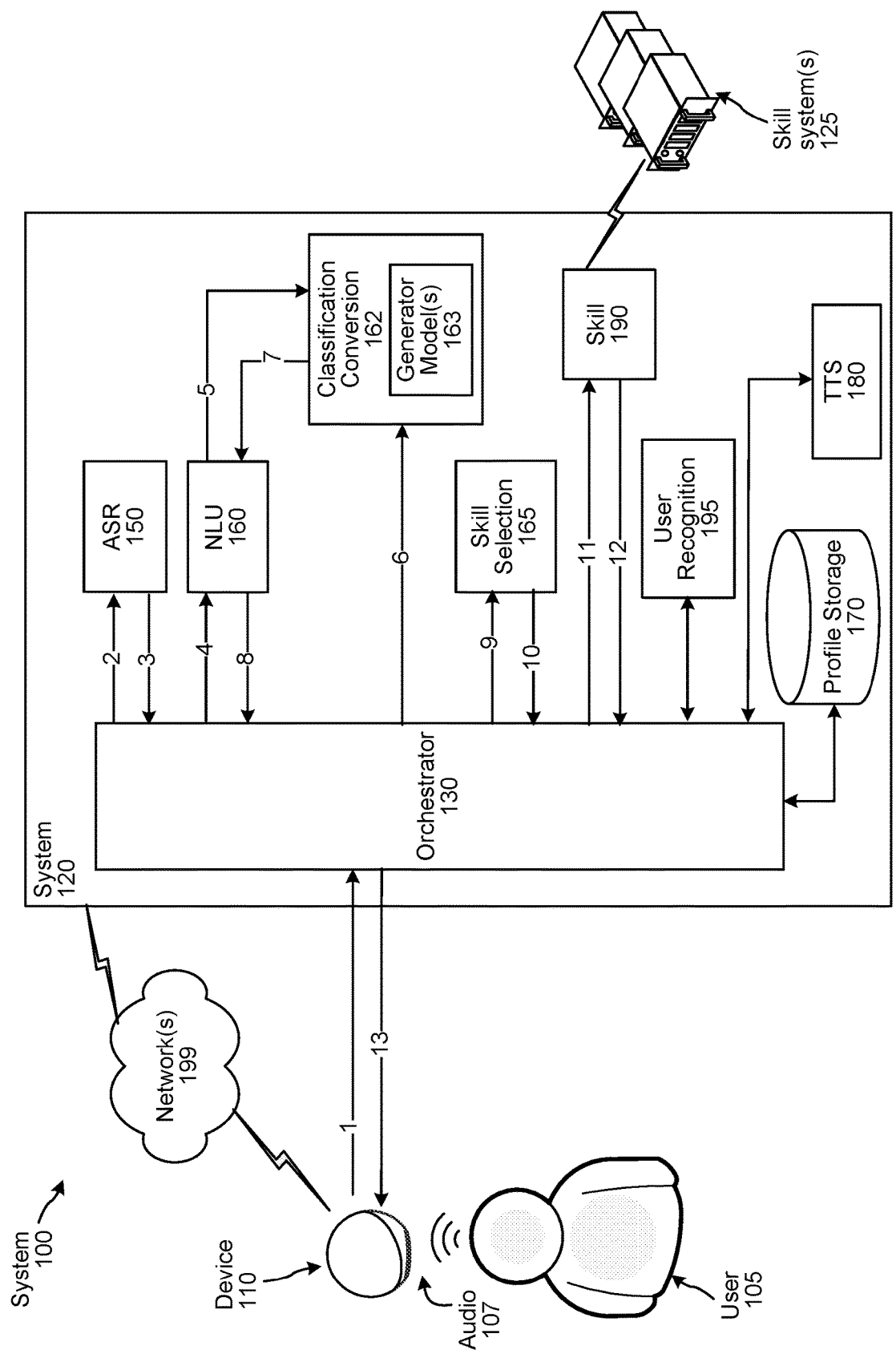
FIGS. 1 and 2 are conceptual diagrams illustrating a system for performing speech processing using a classification conversion component, according to embodiments of the present disclosure.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including Support Vector Machines (SVMs), neural networks (such as deep neural networks (DNNs), recurrent neural networks (RNNs), or convolutional neural networks (CNNs)) and others. As an example, a neural network typically includes an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from user inputs containing natural language. ASR and NLU are often used together as part of a speech processing system. Text-to-speech (TTS) is a field of concerning transforming textual or other representation data into audio data that is synthesized to resemble human speech. Natural language generation (NLG) can also be used to generate human-understandable outputs representing machine representations of information. The NLG outputs can be shared with human users via TTS, displayed text, or other ways of communicating natural language content to a user.

Certain trained models may be configured as classifiers to predict the classification of given data points to a particular class. Classes are sometimes called labels or categories. Classification predictive modeling is the task of approximating a mapping function ($f$) from input variables (X) to discrete output variables (y). Some (single-label) classifiers may be configured to classify data into one of two or more classes. Some (multi-label) classifiers may be configured to classify data into more than one class. A speech processing system may use classifiers, among other trained models, to perform various types of processing. For example, a speech processing system may use a classifier for intent classification, where different intents are represented as different classes and the classifier may determine an intent corresponding to a natural language input. An intent corresponds to an action to be performed that is responsive to the natural language input. As another example, a classifier may be configured to detect a sentiment (e.g., happy, sad, disgust, anger, neutral, positive, negative, etc.) corresponding to a user input. As yet another example, a classifier may for domain classification may determine a domain corresponding to a natural language input.

A domain may be a group of related functionalities that may be provided by one or more skills. As used herein, a "skill" may refer to software, that may be placed on a machine or a virtual machine (e.g., software that may be launched in a virtual instance when called), configured to process with respect to a natural language input, for example, using natural language understanding (NLU) output data (e.g., including an intent and optionally one or more entities) and perform one or more actions in response thereto. What is referred to herein as a skill may sometimes be referred to as an application, bot, action, or the like. An example domain may be a music domain that may provide functionalities related to music, such as, playing music, purchasing music, etc. As another example, a shopping domain may enable a user to purchase various items. As yet another example, a knowledge domain may be configured to provide answers and other information requested by a user.

Classifiers may be trained in a supervised or semi-supervised manner, where some or all of the samples included in the training data may be labeled with the correct classification, and the classifier learns which data points causes the samples to be mapped to the corresponding classification. For example, a natural language input of "I am happy" may be classified to a happy sentiment or a positive sentiment because of the word "happy."

The field of Explainable Artificial Intelligence (AI) focuses on understanding and explaining ML models' interpretation and classification of input data. Explainable AI techniques can be used on the training data to identify problematic training samples, and can also be used to understand why a certain input is classified as part of a specific classification. In a speech processing system, for example, Explainable AI techniques can be used to understand why a particular natural language input is classified as a particular intent.

Some approaches for Explainable AI involve building an explainability ML model that works with the existing classification model and creates a graph or other type of plot of features to determine which inputs were responsible for a specific classification. Such an ML model requires a large amount of training data to learn the classification task. Moreover, such approaches for explaining modeling decisions are based, in many cases, on changes of gradients or the error function of that model, so that these kinds of explainability models are susceptible to adversarial examples, which actually make use of small permutations to change the overall classification. Some explainability models may end up focusing on model deficiencies instead of actually explaining why a certain input is part of a certain classification. The techniques of the present disclosure address these challenges.

The present disclosure relates to techniques for understanding and explaining processing performed with respect to an input, where the processing involves use of at least one classifier model. The techniques of the present disclosure involve using, what is referred to herein as, generator models. A generator model, which may be a neural network or other form of ML model, is configured to convert an input belonging to a particular class (class A) to an input that belongs to another class (class B), where the classes A and B are alternatives of each other. The input outputted by a generator model is referred to herein as a machine-generated input. In some embodiments, the original input may be processed with respect to the machine-generated input to determine the change(s) between them, where the change(s) can explain which portion of the original input causes its classification to the particular class A. In some cases, the generator model may not change the received input if the original received input already belongs to the class (class B) that the generator model is configured to output.

One example generator model may be configured to convert an input corresponding to a positive sentiment (class A) to a machine-generated input corresponding to a neutral sentiment (class B). For example, such a generator model may receive the input "I am happy" (belonging to the positive sentiment class) and may output the machine-generated input "I am okay" (belonging to the neutral sentiment class). Based on processing the input with respect to the machine-generated input, a system may determine that "happy" caused the input to be classified to the positive sentiment class.

The system can implement multiple different generator models for multiple different classification tasks. For example, one generator model may convert an input corresponding to a positive sentiment class to a machine-generated input corresponding to a neutral sentiment class. Another example generator model may convert an input corresponding to a negative sentiment class to a machine-generated input corresponding to a neutral sentiment class. Another example generator model may convert an input corresponding to a neutral sentiment class to a machine-generated input corresponding to a positive sentiment class. Another example generator model may convert an input corresponding to a first domain (e.g., shopping domain) to machine-generated input corresponding to a second domain (e.g., knowledge domain). Another example generator model may convert an input corresponding to a first intent to machine-generated input corresponding to a second intent.

The present disclosure further relates to generating output data based on the portion determined to cause the input to be classified to a particular class. In some example embodiments, a system can generate output data explaining that processing with respect to an input was performed because of the determined portion being classified to the particular class. Such output data may be presented to a user (e.g., as synthesized speech, displayable text/graphics, etc.) in response to the user requesting the system to explain processing results for an input. For example, a user may say "play music by [artist]" and the system may play a music video by the indicated artist. In response, the user may say "why are you playing the video?" or "why did you do that?", and the system may output synthesized speech representing "play music was understood as a request for a music video" based on the system determining, using the generator models and other techniques described herein, that "play music" was classified to an intent for playing a music video.

In other example embodiments, a system can confirm a classification of an input or can change a classification of an input based on the determined portion that causes classification to a particular class. For example, a first generator model may be configured to convert an input corresponding to a first domain (e.g., a shopping domain, a music domain, etc.) to a machine-generated input corresponding to a second domain, which may be the desired domain (e.g., a knowledge domain). The system may process a natural language input from a user and determine that the natural language input corresponds to the knowledge domain. To confirm this domain classification is accurate, the system may process the natural language input using the first generator model. The first generator model may output a machine-generated input corresponding to the knowledge domain. If there is no difference between the machine-generated input and the natural language input, then the system can confirm that the natural language input is accurately classified to the knowledge domain. If there are differences between the machine-generated input and the natural language input, then the system can perform further processing and change the classification of the natural language input to another domain (different than the knowledge domain).

In other example embodiments, a system can generate output data based on determining that a portion of the input corresponds to a particular class. In one embodiment, a system may process a natural language input using a generator model configured to covert an input corresponding to a positive, negative, or other non-neutral sentiment class to a machine-generated input corresponding to a neutral sentiment class. Based on processing the machine-generated input with respect to the natural language input, the system may determine that natural language input corresponds to a positive, negative, or other sentiment, and may generate output data requesting feedback from the user. For example, the user may say "That movie is awesome," the system may process this input using the generator model and may determine that the input corresponds to a positive sentiment class. The system may then present the output "Why did you like it?" to solicit feedback from the user. In another example, the user may say "Huh, but I didn't like it," the system may process this input using the generator model, may determine that the input corresponds to a negative sentiment class, and may determine that "didn't like" caused the input to be classified to the negative sentiment class. The system may then determine output data using the portion ("didn't like") determined to cause classification to the negative sentiment class, and may present the output "What did you not like about it?" to solicit further information from the user. As another example in which the system may perform similar processing, if the user said "That was stupid," the system may output "What was stupid about that?"

In some embodiments, the techniques of the present disclosure can be used to evaluate training data for a classification task. A classifier model can be trained using training data that includes samples for the different classes the classifier model is being configured to predict. If the classifier model is to perform a binary classification (determine whether input data corresponds to a class or does not correspond to the class), then the training data likely includes samples that correspond to the class, and samples that do not correspond to the class. The samples may be labeled with the corresponding class. Depending on the quality and number of the samples in the training data, the classifier model can be configured to accurately classify a given input. In some situations, the classes can have small differences, which may be difficult for the classifier model to determine especially if the training data does not include adequate samples for the classes. For example, within domain classification processing (which involves a classifier model determining which domain a natural language input corresponds to), it may be difficult to determine whether an input corresponds to a shopping domain or a knowledge domain. This may be a result of the samples included in the training data. The techniques of the present disclosure can be used to evaluate the training data to determine whether a sample is labeled with an accurate class. For example, a first generator model configured to convert an input corresponding to a shopping domain to a machine-generated input corresponding to a knowledge domain may be used to process a sample from the training data. If there is no difference between the machine-generated input and the sample, then the system may determine that the sample corresponds to the knowledge domain. If there are differences between the machine-generated input and the sample, then the system may determine that the sample does not correspond to the knowledge domain. The system may further use a second generator model configured to convert an input corresponding to a knowledge domain to a machine-generated input corresponding to a shopping domain to process a sample from the training data. If there is no difference between the machine-generated input of the second generator model and the sample, then the system may determine that the sample corresponds to the shopping domain. If there are differences between the machine-generated input and the sample, then the system may determine that the sample does not correspond to the shopping domain. The first generator model and the second generator model may also be used to generate more samples (the machine-generated inputs) that can be included in the training data.

In some embodiments, a generator model is a neural network configured using unsupervised or semi-supervised training techniques and training data including samples corresponding to a first class and samples corresponding to a second class, where the generator model may be configured to convert inputs corresponding to the first class to machine-generated inputs corresponding to the second class. Some embodiments use what is referred to herein as cycle consistency loss for configuring the generator model. The cycle consistency loss involves having two different generator models-a first generator model G_ab that transforms an input corresponding to class A to a machine-generated input corresponding to class B, and a second generator model G_ba that transforms an input corresponding to class B to a machine-generated input corresponding to class A. The first and second generator models can be trained via a combination of generative adversarial networks, which in addition to the generator models G_ab and G_ba also involve have two discriminator models—D_a being able to identify samples corresponding to class A and D_b being able to identify samples corresponding to class B. The system additionally uses a similarity loss L_sima and L_simb, which is added to the overall training loss in a cycle architecture, to ensure that the machine-generated inputs from G_ab and G_ba are penalized if they are too different from the original input.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

Figure 2:
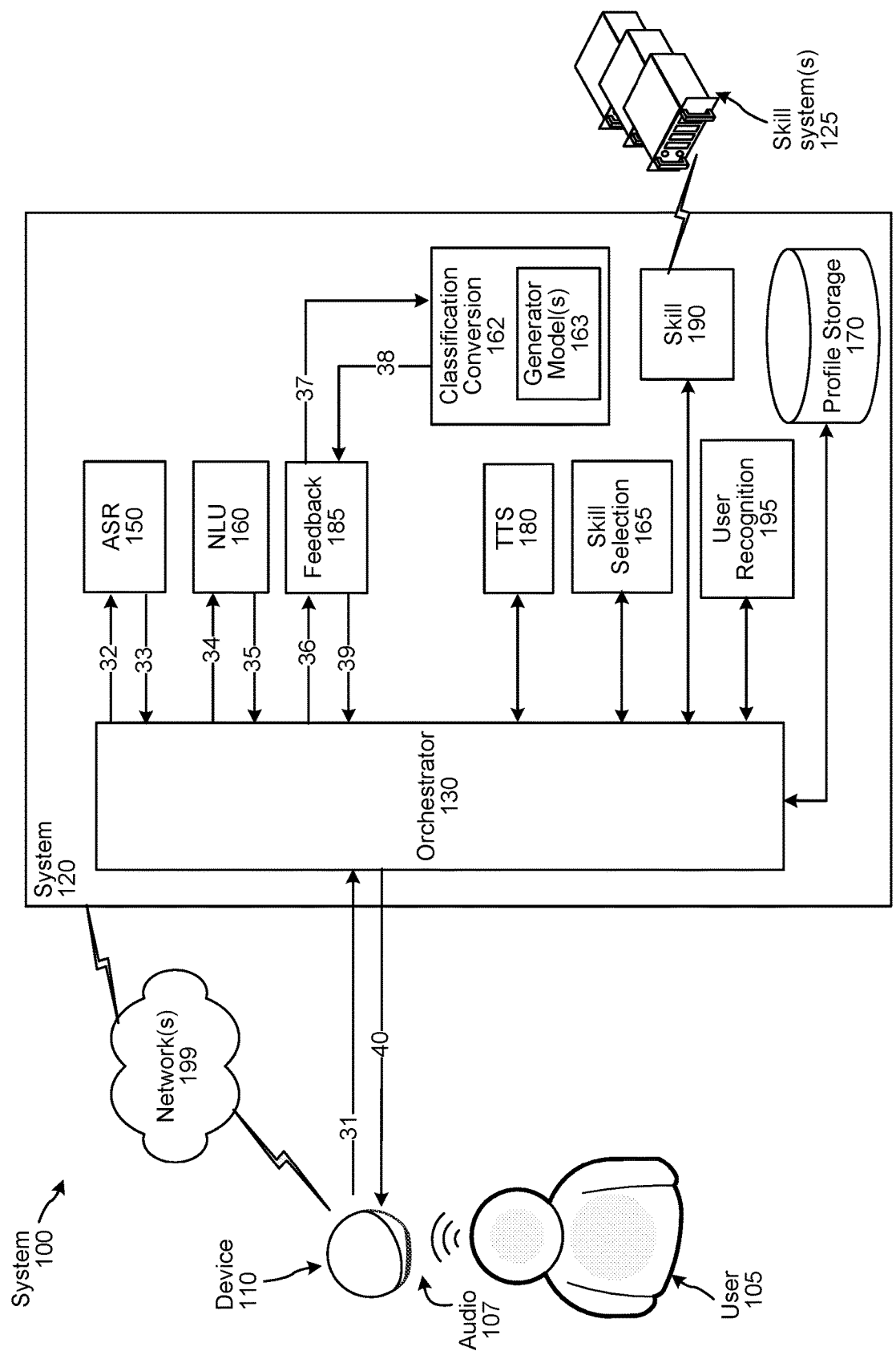

FIGS. 1 and 2 show a system 100 configured to perform speech processing using a classification conversion component 162, which may implement one or more generator models 163 described herein. As shown in FIGS. 1 and 2, the system 100 may include a device 110, local to a user 105, and one or more systems 120 connected across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech processing system configured to process spoken natural language inputs using ASR and NLU processing. The system 120 may include multiple components to facilitate speech processing, such as, an orchestrator component 130, an ASR component 150, a NLU component 160, a skill selection component 165, a feedback component 185, and one or more skill components 190. The system 120 may also include a profile storage 170, a TTS component 180, and a user recognition component 195 to facilitate processing of users inputs and generating outputs. One or more of the skill components 190 may be in (wired or wireless) communication with a skill system(s) 125 located remote/external to the system 120.

FIG. 1 shows an example embodiment of the system 100 configured to use the classification conversion component 162 with respect to NLU output data determined by the NLU component 160. The user 105 may speak an input, and the device 110 may capture audio 107 representing the spoken input. In other examples, the user 105 may alternatively or additionally provide another type of input (e.g., selection of a button, selection of displayed graphical interface elements, may perform a gesture, etc.). The device 110 may send (step 1) input data including audio data corresponding to the audio 107 (and/or other type of input data, such as, image data, text data, etc.) corresponding to the user input to the system 120 for processing. In particular, the orchestrator component 130 may receive the input data from the device 110.

In the case that the input data (received in step 1) is audio data, the orchestrator component 130 may send (step 2) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 3) the ASR data to the orchestrator component 130.

The orchestrator component 130 may send (step 4) the ASR data to the NLU component 160. The NLU component 160 may determine NLU data corresponding to the user input, where the NLU data may include one or more NLU hypotheses, each NLU hypothesis may include a domain, an intent, one or more entities (if applicable), and corresponding confidence scores. Further details about how the NLU component 160 determines NLU data are described below in relation to FIG. 4. The NLU component 160 may send (step 5) the NLU data, corresponding to the user input, to the classification conversion component 162. In some embodiments, the NLU data may be sent to the classification conversion component 162 by the NLU component 160 via the orchestrator component 130. The orchestrator component 130 may send (step 6) the ASR data, corresponding to the user input, to the classification conversion component 162.

The classification conversion component 162 may implement one or more generator models 163 associated with particular domains or particular intents. Other details of the classification conversion component 162 are described below in relation to FIG. 6. In some embodiments, a first generator model may be configured to convert an input corresponding to a first domain to a machine-generated input corresponding to a second (non-first/alternative) domain, a second generator model may be configured to convert an input corresponding to the second domain to a machine-generated input corresponding to the first domain, a third generator model may be configured to convert an input corresponding to the second domain to a machine-generated input corresponding to a third domain, etc. In some embodiments, a fourth generator model may be configured to convert an input corresponding to a first intent to a machine-generated input corresponding to a second intent, a fifth generator model may be configured to convert an input corresponding to the second intent to a machine-generated input corresponding to the first intent, a sixth generator model may be configured to convert an input corresponding to the second intent to a machine-generated input corresponding to a third intent, etc. Each generator model 163 may be configured to convert an input from one class (e.g., a particular domain, a particular intent, etc.) to a machine-generated input of another specified class (e.g., another particular domain, another particular intent, etc.).

Depending on the domain(s) and intent(s) represented in the NLU data, the classification conversion component 162 may select one or more generator models 163 to process the ASR data corresponding to the user input. The classification conversion component 162 may include (as part of a generator selector component 610 described in relation to FIG. 6) rules data or other data indicating when and which generator models are to be selected for execution.

Figure 6:
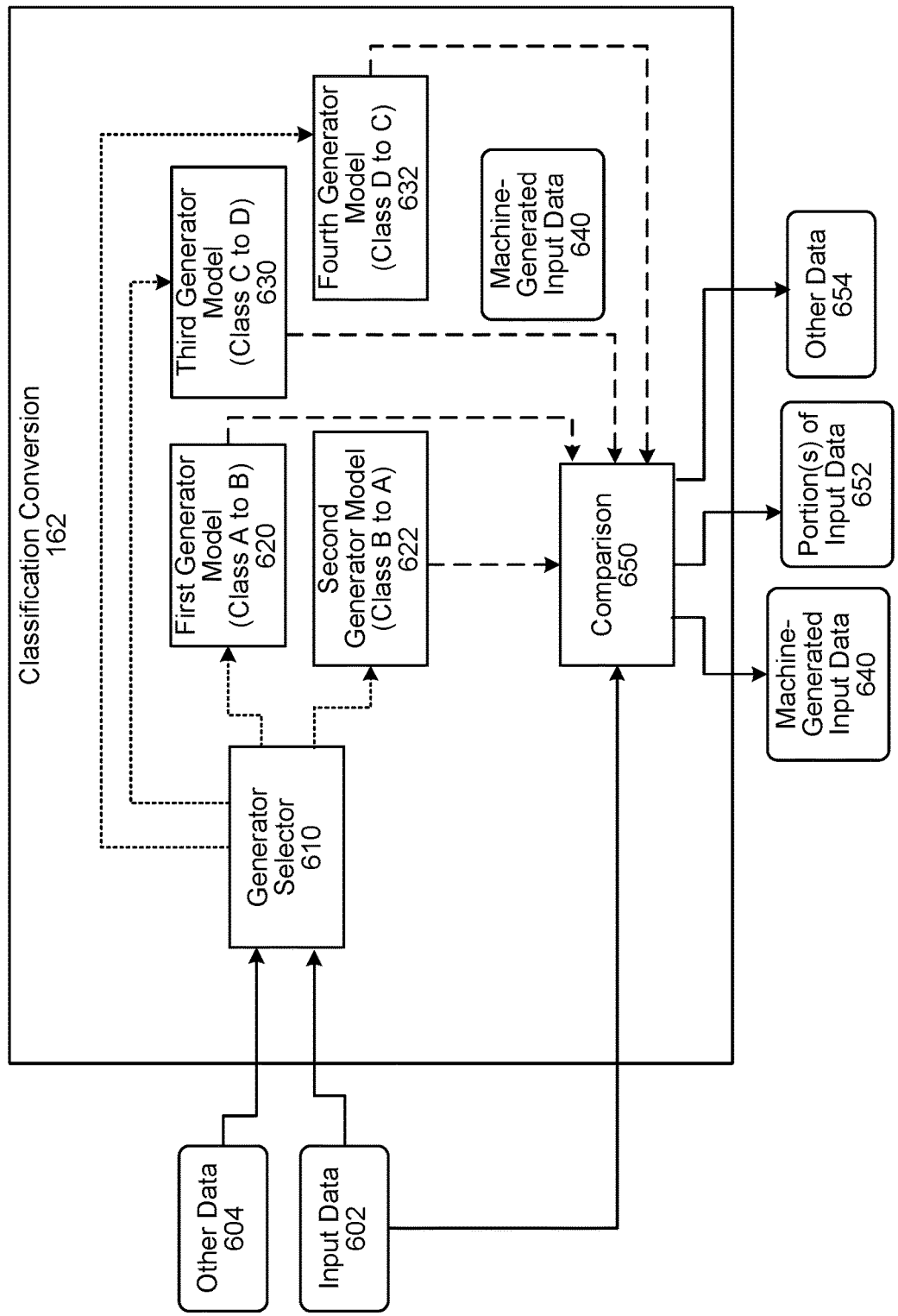
FIG. 6 is a conceptual diagram illustrating components of a classification conversion component, according to embodiments of the present disclosure.

The classification conversion component 162 may process (e.g., using a comparison component 650 described in relation to FIG. 6) the user input (ASR data) with respect to the machine-generated input to determine if any differences exist between the two. Based on this processing, the classification conversion component 162 may determine a portion(s) of the user input that caused the user input to be classified to the particular class. In other cases, based on this processing, the classification conversion component 162 may determine a portion(s) of the user input that does not correspond to a particular class.

The classification conversion component 162 may send (step 7) the machine-generated input and/or data representing the portion(s) of the user input that caused the user input to be classified to the particular class to the NLU component 160. In some embodiments, the classification conversion component 162 may send the machine-generated input and/or the data representing the determined portion(s) of the user input to the NLU component 160 via the orchestrator component 130. In some embodiments, the classification conversion component 162 may also send an indication of whether the user input is correctly classified or not. This indication may be based on whether there are differences between the user input and the machine-generated input.

For example, the system 120 may receive a user input "Show me information about [object]." The NLU component 160 may determine that the user input corresponds to a knowledge domain. The classification conversion component 162 may receive ASR data representing the user input, and may process the ASR data using a generator model configured to convert inputs corresponding to another domain (e.g., shopping domain, music domain, etc.; also referred to as a non-class or alternative-class) to machine-generated inputs corresponding to the knowledge domain. The machine-generated input determined by the generator model may be "Show me information about [object]." The classification conversion component 162 may determine that there are no differences between the user input and the machine-generated input, and may send data indicating so to the NLU component 160. Based on this indication, the NLU component 160 may confirm that the user input corresponds to the knowledge domain, and may not update the NLU data corresponding to the user input.

As another example, the system 120 may receive a user input "Show me weather for [city]." The NLU component 160 may determine that the user input corresponds to a knowledge domain. The classification conversion component 162 may receive ASR data representing the user input, and may process the ASR data using a generator model 163 configured to convert inputs corresponding to another domain (e.g., shopping domain, music domain, etc.; also referred to as a non-class or alternative class) to machine-generated inputs corresponding to the knowledge domain. The machine-generated input determined by the generator model 163 may be "Show me information for [city]." The classification conversion component 162 may process the user input with respect to the machine-generated input, and may determine that the portion "weather" of the user input is changed to "information" by the generator model 163 while converting the user input to correspond to the knowledge domain. The classification conversion component 162 may send data representing "weather" to the NLU component 160 and the machine-generated input "Show me information for [city]." Alternatively or additionally, the classification conversion component 162 may send an indication that the user input was changed by the generator model 163 or does not correspond to the knowledge domain (or other similar indications). Based on receiving the data/indication from the classification conversion component 162, the NLU component 160 may update the NLU data corresponding to the user input. For example, the NLU component 160 may remove one or more NLU hypotheses from the NLU data that include the knowledge domain. As another example, the NLU component 160 may change (e.g., decrease) the confidence score of a NLU hypothesis including the knowledge domain.

The NLU component 160 may update the NLU data based on the data received from the classification conversion component 162. For example, the NLU component 160 may update a domain included in the NLU data and/or an intent included in the NLU data based on the classification conversion component 162 indicating that the user input corresponds to a different domain or intent than the ones included in the NLU data. The NLU component 160 may not update the NLU data based on the classification conversion component 162 confirming that the user input corresponds to the domain or intent included in the NLU data.

The NLU component 160 may send (step 8), to the orchestrator component 130, updated NLU data (or the originally determined NLU data) based on the data received from the classification conversion component 162. The orchestrator component 130 may send (step 9) the NLU data to the skill selection component 165. The skill selection component 165 may be configured to determine which skill component 190 is capable of responding to the user input. The skill selection component 165 may make this determination based on which skill component 190 is capable of processing the intent and the entity data (if applicable) included in the NLU data.

The skill selection component 165 may send (step 10) a skill identifier associated with the skill component 190 to the orchestrator component 130. The orchestrator component 130 may send (step 11) the NLU data corresponding to the user input and a command to process with respect to the NLU data to the skill component 190 associated with the skill identifier. The skill component 190 may determine an output responsive to the user input based on the NLU data.

The skill component 190 may send (step 12) output data responsive to the user input to the orchestrator component 130. The orchestrator component 130 may send (step 13) the output data to the device 110, causing the device 110 to present the output to the user 105. In some cases, the output may include text, graphics, images, or other type of data that may be displayed at the device 110. In other cases, the output may alternatively or additionally include audio data representing synthesized speech. In such cases, the orchestrator component 130 may send the output data from the skill component 190 to the TTS component 180 for determining output audio data representing synthesized speech. The orchestrator component 130 may send the output audio data to the device 110 to present to the user 105.

In some embodiments, based on updating the NLU data corresponding to the user input (the NLU data may be updated based on an output of the classification conversion component 162 as described above), the system 120 may perform disambiguation, where the system may ask the user 105 for clarification or confirmation regarding the user input. In some embodiments, the system 120 may present output data requesting confirmation of how the system is to process with respect to the user input. For example, for a user input "Show me information for [object]", the system 120 may determine that the user input corresponds to the shopping domain (based on processing by the classification conversion component 162 and/or the NLU component 160), and the system 120 may present output data (as synthesized speech or displayable data) "Do you want to see purchase information for [object]?" or "Do you want shopping information for [object]?" or other similar natural language outputs confirming that the user input is to be processed using the shopping domain. In some embodiments, the system 120 may present output data requesting clarification on how the system is to process with respect to the user input. For example, for a user input "Play music by [artist]", the system may determine that the user input corresponds to a <PlayMusic Video> intent ((based on processing by the classification conversion component 162 and/or the NLU component 160), and the system 120 may present output data (as synthesized speech or displayable data) "Do you want to see a music video by [artist] or listen to a song by [artist]?" or other similar natural language outputs offering options to the user on how the user input is to be processed.

In this manner, the system 120 may use the classification conversion component 162 to update NLU data corresponding to a user input, so that an output responsive to the user input is a desired response. The system 120 may use a generator model configured to convert inputs from a non-class to machine-generated inputs from a desired class, and may determine whether a user input corresponds to the desired class based on whether or not the machine-generated input is different than the user input. For example, if the user input truly belongs to a first domain, then a generator model, configured to convert inputs for another domain to machine-generated inputs for the first domain, may not change the user input since it already belongs to the first domain.

FIG. 2 shows an example embodiment of the system 100 configured to use the classification conversion component 162, including the generator model(s) 163, with respect to the feedback component 185. The user 105 may speak an input, and the device 110 may capture audio 107 representing the spoken input. In other examples, the user 105 may alternatively or additionally provide another type of input (e.g., selection of a button, selection of displayed graphical interface elements, may perform a gesture, etc.). The device 110 may send (step 31) input data including audio data corresponding to the audio 107 (and/or other type of input data, such as, image data, text data, etc.) corresponding to the user input to the system 120 for processing. In particular, the orchestrator component 130 may receive the input data from the device 110.

In the case that the input data (received in step 31) is audio data, the orchestrator component 130 may send (step 32) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 33) the ASR data to the orchestrator component 130.

The orchestrator component 130 may send (step 34) the ASR data to the NLU component 160. The NLU component 160 may determine NLU data corresponding to the user input, where the NLU data may include one or more NLU hypotheses, each NLU hypothesis may include a domain, an intent, one or more entities (if applicable), and corresponding confidence scores. Further details about how the NLU component 160 determines NLU data are described below in relation to FIG. 4. The NLU component 160 may send (step 35) the NLU data, corresponding to the user input, to the orchestrator component 130. The orchestrator component 130 may send (step 36) the ASR data and the NLU data to the feedback component 185. In some embodiments, the feedback component 185 may only receive or use ASR data corresponding to a user input. The feedback component 185 may be configured to process user inputs, determine feedback information from the user inputs, generate output data soliciting feedback from the user 105 and/or generate output data providing feedback information to the user 105.

In some embodiments, the feedback component 185 may determine to solicit feedback from the user 105 based on the user input, received in step 31, corresponding to a particular sentiment. The feedback component 185 may send (step 37) the ASR data to the classification conversion component 162, along with a command (or other data) to determine whether the user input includes a positive or negative sentiment. In this example embodiment, the generator model(s) 163 may be configured to convert an input corresponding to a first sentiment class (e.g., a positive sentiment class, a negative sentiment class, an anger sentiment class, a joy sentiment class, etc.) to an input corresponding to a second (alternative) sentiment class (e.g., a non-positive sentiment class, a non-negative sentiment class, a non-anger sentiment class, a non-joy sentiment class, etc.) different than the first sentiment class. The classification conversion component 162 may process the ASR data corresponding to the user input using a first generator model 163 configured to convert an input corresponding to a positive sentiment class to a machine-generated input corresponding to a neutral/non-positive sentiment class. The classification conversion component 162 may (using the comparison component 650) process the machine-generated input with respect to the user input to determine whether there are differences between the two, and determine a portion(s) of the user input that is different than the machine-generated input. If there are no differences, then the classification conversion component 162 may send (step 38) an indication to the feedback component 185 that there are no differences between the user input and the machine generated input from the first generator model 163. Based on this indication, the feedback component 185 may determine that the user input corresponds to a neutral sentiment class, and does not include any expressed positive sentiment. Based on this determination, the feedback component 185 may not solicit further feedback from the user 105. If there are differences between the user input and the machine-generated input, then the classification conversion component 162 may send (step 38) the portion(s) of the user input that is different than the machine-generated input and/or the machine-generated input to the feedback component 185. Based on the portion(s) of the user input, the feedback component 185 may determine to solicit feedback from the user 105.

Additionally or alternatively, the classification conversion component 162 may process the ASR data corresponding to the user input using a second generator model 163 configured to convert an input corresponding to a negative sentiment class to a machine-generated input corresponding to a neutral/non-negative sentiment class. The classification conversion component 162 may (using the comparison component 650) process the machine-generated input with respect to the user input to determine whether there are differences between the two, and determine a portion(s) of the user input that is different than the machine-generated input. If there are no differences, then the classification conversion component 162 may send (step 38) an indication to the feedback component 185 that there are no differences between the user input and the machine generated input from the second generator model. Based on this indication, the feedback component 185 may determine that the user input corresponds to a neutral sentiment class, and does not include any expressed negative sentiment. Based on this determination, the feedback component 185 may not solicit further feedback from the user 105. If there are differences between the user input and the machine-generated input, then the classification conversion component 162 may send (step 38) the portion(s) of the user input that is different than the machine-generated input and/or the machine-generated input to the feedback component 185. Based on the portion(s) of the user input, the feedback component 185 may determine to solicit feedback from the user 105.

Alternatively, the classification conversion component 162 may process the ASR data corresponding to the user input using a third generator model 163 that may be configured to convert an input corresponding to a positive or negative sentiment class to a machine-generated input corresponding to a neutral/non-positive/non-negative/alternative sentiment class. The classification conversion component 162 may (using the comparison component 650) process the machine-generated input with respect to the user input to determine whether there are differences between the two, and determine a portion(s) of the user input that is different than the machine-generated input. If there are no differences, then the classification conversion component 162 may send (step 38) an indication to the feedback component 185 that there are no differences between the user input and the machine generated input from the third generator model 163. Based on this indication, the feedback component 185 may determine that the user input corresponds to a neutral sentiment class, and does not include any expressed negative sentiment. Based on this determination, the feedback component 185 may not solicit further feedback from the user 105. If there are differences between the user input and the machine-generated input, then the classification conversion component 162 may send (step 38) the portion(s) of the user input that is different than the machine-generated input and/or the machine-generated input to the feedback component 185. Based on the portion(s) of the user input, the feedback component 185 may determine to solicit feedback from the user 105.

For example, in the foregoing embodiments, the system 120 may receive a user input "This movie is awesome." The classification conversion component 162 may process ASR data corresponding to the user input using the first generator model configured to convert inputs corresponding to a positive sentiment class to machine-generated inputs corresponding to a neutral sentiment class, and may determine the machine-generated input "This movie is okay." The classification conversion component 162 may then determine, based on processing the user input "This movie is awesome" with respect to the machine-generated input "This movie is okay" that "awesome" causes the user input to correspond to the positive sentiment class. The classification conversion component 162 may send data representing "awesome" to the feedback component 185. Such data may be text data representing the word "awesome" or may be data representing the user input with the portion "awesome" being tagged or annotated. The classification conversion component 162 may also send the machine-generated input "This movie is okay" to the feedback component 185. The feedback component 185, based on the portion "awesome" of the user input, may determine output data soliciting feedback from the user 105, where such output data may be "Would you like to rate the movie?" and may be presented as synthesized speech and/or displayed at the device 110. In other examples, the feedback component 185 may generate output data representing "Would you like to find similar movies?" or may present a list of movies similar to the instant movie and present output data representing "Here are movies like this one."

In another example, the system 120 may receive a user input "This movie is bad," and the system 120 may perform processing similar to the foregoing example. The feedback component 185 may generate output data, based on the portion "bad" of the user input, soliciting feedback from the user 105. Such output data may represent "Would you like to rate the movie?" In other examples, the feedback component 185 may generate output data representing "Would you like to find a different movie?" or may present a list of movies that are in different (e.g., different genre, different characters, different plots, different actors, etc.) than the instant movie.

In another example, the system 120 may receive the user input "That is wrong." The classification conversion component 162 may process ASR data corresponding to the user input using the second generator model configured to convert inputs corresponding to a negative sentiment class to machine-generated inputs corresponding to a neutral sentiment class, and may determine the machine-generated input "That is okay." The classification conversion component 162 may then determine, based on processing the user input "That is wrong" with respect to the machine-generated input "That is okay" that "wrong" causes the user input to correspond to the negative sentiment class. The classification conversion component 162 may send data representing "wrong" to the feedback component 185. The classification conversion component 162 may also send the machine-generated input "That is okay" to the feedback component 185. The feedback component 185, based on the portion "wrong" of the user input, may determine output data soliciting feedback from the user 105, where such output data may be "Why is it wrong?" or "Can you tell me why that was wrong?" and may be presented as synthesized speech and/or displayed at the device 110.

In some embodiments, the feedback component 185 may determine that the user input (received in step 31) requests explanation of processing performed with respect to a prior user input (e.g., the user input received in step 1 of FIG. 1). The feedback component 185 may make this determination based on the NLU data corresponding to the user input. In such cases, the feedback component 185 may determine ASR data and NLU data that was used to process with respect to the prior user input. Such information may be available via a dialog management component that may be included in the system 120.

A dialog management component may manage and store data relating to a dialog session. The system 120 may be configured to respond to the user 105 across multiple exchanges between the user and the system. Such exchanges may be part of an ongoing conversation between the system 120 and the user 105, which may be referred to as a dialog. As used herein, a "dialog," "dialog session," "session," or the like refers to various related user inputs and system responses, for example inputs and outputs related to an ongoing exchange between a user and the system. A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the system response. The dialog management component configured to engage in dialogs with a user may use the dialog session identifier or other data to track the progress of the dialog to select system responses in a way that tracks the previous user-system exchanges, thus moving the dialog along in a manner that results in a desirable user experience. The dialog management component may store dialog history data corresponding to one or more turns of a dialog including, but not limited to, ASR data representing a user input of the dialog, NLU data corresponding to the user input, and system response corresponding to the user input.

The feedback component 185 may send (step 37) the ASR data corresponding to the prior user input to the classification conversion component 162, along with a command (or other data) that may indicate which generator models are to be used. Based on the domain(s) and/or intent(s) included in the NLU data corresponding to the prior user input, the feedback component 185 may determine which generator models are to be used. For example, the NLU data may include a first domain corresponding to the prior user input, and the feedback component 185 may determine that a first generator model configured to convert an input corresponding to the first domain to a machine-generated input corresponding to a second domain is to be used. The classification conversion component 162 may process the ASR data corresponding to the prior user input using the first generator model 163, may process the machine-generated input from the first generator model with respect to the ASR data, and may determine a portion(s) of the prior user input that is different than the machine-generated input. The classification conversion component 162 may send (step 38) data representing the portion(s) of the prior user input to the feedback component 185. The feedback component 185 may determine output data using the portion(s) of the prior user input and the first domain, where the output data may represent that the portion(s) of the prior user input caused classification of the prior user input to the first domain.

For example, in the foregoing embodiments, the system 120 may receive a prior user input "Show me information about [object]." The system 120 may process the prior user input, may determine that the prior user input corresponds to a shopping domain, and may determine output data responsive to the prior user input using data corresponding to the shopping domain. After the output data is presented, the user 105 may say "Why did you do that?" or "Why did you show me a shopping page for [object]?" The system 120 may process this user input, and may determine that the user input requests explanation of processing performed with respect to the prior user input. The feedback component 185 may then send ASR data representing the prior user input "Show me information about [object]" to the classification conversion component 162, along with a command to use a generator model configured to convert inputs corresponding to a shopping domain to machine-generated inputs corresponding to a knowledge domain (or another domain). The generator model 163 may determine the machine-generated input "Tell me information about [object]." Based on processing the prior user input with respect to the machine-generated input, the classification conversion component 162 may determine that "Show me" caused the prior user input to be classified to the shopping domain. The classification conversion component 162 may send data representing "Show me" to the feedback component 185, and the feedback component 185 may generate output data explaining that "Show me" caused the user input to be processed by the shopping domain. For example, the output data may be "Your input was routed to the shopping domain," "Your request was routed to the shopping domain," "Because you said "show me" the request was processed by the shopping domain" or other similar explanations.

As another example, the system 120 may receive a prior user input "Play music by [artist]." The system 120 may process the prior user input, may determine that the prior user input corresponds to a <PlayMusic Video> intent, and may output a music video by the indicated artist. After the output data is presented, the user 105 may say "Why did you do that?" or "Why are you playing a music video?" The system 120 may process this user input, and may determine that the user input requests explanation of processing performed with respect to the prior user input. The feedback component 185 may then send ASR data representing the prior user input "Play music by [artist]" to the classification conversion component 162, along with a command to use a generator model configured to convert inputs corresponding to a <PlayMusic Video> intent to machine-generated inputs corresponding to another different intent (e.g., <AskQuestion> intent, <ShowMe> intent, etc.). The generator model may determine the machine-generated input "Show music by [artist]." Based on processing the prior user input with respect to the machine-generated input, the classification conversion component 162 may determine that "Play" caused the prior user input to be classified to the <PlayMusic Video> intent. The classification conversion component 162 may send data representing "Play" to the feedback component 185, and the feedback component 185 may generate output data explaining that "Play" caused the user input to be processed in a manner that caused output of a music video.

The feedback component 185 may use one or more natural language generation (NLG) techniques to determine output data as described herein. Such NLG techniques may involve processing structured data or other representation data to determine a natural language output. The structured data or other representation data may include an object, a verb, a subject, a tense, and/or other grammar information that can be used to generate the natural language output. In some embodiments, the NLG techniques may involve use of one or more templates and filling portions of the templates using the structured data or other representation data to generate the natural language output. For example, one template for explaining processing performed with respect to a user input may be "Because you said $determined portion$ the request was processed with $domain or intent$" where the $determined portion$ may be filled with the portion determined by the classification conversion component 162 (e.g., "Show me" or "Play" from the above examples) and the $domain or intent$ may be filled with the domain or intent the user input is classified to (e.g., "shopping domain" or "play video intent"). In other embodiments, the NLG techniques may involve use of one or more ML models (e.g., neural networks, encoder-decoder architecture, etc.) to generate the natural language output.

In some embodiments, the feedback component 185 may be implemented as a skill, and may be selected by the skill selection component 165, based on the NLU data corresponding to the user input, to process the user input (received in step 31) and generate an output.

The feedback component 185 may send (step 39) output data to the orchestrator component 130. The orchestrator component 130 may send (step 40) the output data to the device 110, causing the device 110 to present the output to the user 105. In some cases, the output may include text, graphics, images, or other type of data that may be displayed at the device 110. In other cases, the output may alternatively or additionally include audio data representing synthesized speech. In such cases, the orchestrator component 130 may send the output data from the feedback component 185 to the TTS component 180 for determining output audio data representing synthesized speech. The orchestrator component 130 may send the output audio data to the device 110 to present to the user 105.

In this manner, the system 120 may use the classification conversion component 162 to solicit feedback from the user 105 and to provide an output responsive to a user input requesting explanation of processing performed with respect to a prior user input. The system 120 may determine a portion of a user input that causes the user input to be classified to a particular class, and may generate output data based on the determined portion. This portion may be determined based on differences between the user input and the machine-generated input. Based on the type of information the system 120 needs to determine, the appropriate generator model(s) may be used.

Although FIGS. 1 and 2 illustrate the classification conversion component 162 being implemented as a separate component, in some embodiments, the classification conversion component 162 may be included in the NLU component 160, the feedback component 185, and/or another component of the system 120 (or the device 110).

In some embodiments, the systems and methods described herein can be used to evaluate training data for classification tasks. For example, a ML classifier model may be configured to classify natural language inputs to a first domain. The training data for configuring such a ML classifier may include samples that correspond to the first domain and may also include samples that do not correspond to the first domain. Such samples may be labeled accordingly. A generator model configured to convert inputs corresponding to another domain to machine-generated inputs corresponding to the first domain can be used to evaluate the samples. For example, a sample labeled as corresponding to the first domain may be processed using the generator model to determine a machine-generated input. If there is no difference between the sample and the machine-generated input, then the system may determine that the label for the sample is accurate (i.e. the sample corresponds to the first domain). If there is a difference between the sample and the machine-generated input, then the system may determine that the label for the sample may be inaccurate (i.e. the sample may not correspond to the first domain). In such cases, the particular sample may be flagged for further investigation, may be flagged to update the label, or may be removed from the training data for the ML classifier model, or the system may update the label for the particular sample, such that the updated label represents a different domain than the first domain or that the sample represents a negative (non-first domain) sample for training purposes. In a similar manner, training data for other classification tasks may be evaluated.

In some embodiments, the systems and methods described herein can be used to convert natural language inputs corresponding to a first topic to machine-generated inputs corresponding to a second topic. Such natural language inputs may be a news headline, a social media post, a portion of an article, blog post, etc. An example generator model may be configured to convert a news headline corresponding to a first topic, like politics, to a second topic, like wellness/health related. Another example generator model may be configured to convert from a first topic to a non-first topic, and processing a news headline, for example, may result in a change in the news headline, where the changed portion can be determined to cause the news headline to be classified to the first topic.

The system 120 may use other components illustrated in FIGS. 1 and 2. The various components shown in FIGS. 1 and 2 may be located on a same or different physical devices. Communication between various components may occur directly or across the network(s) 199.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 320 (shown in FIG. 3). The wakeword detection component 320 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 320 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 320 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 320 detects a wakeword, the device 110 may "wake" and begin transmitting audio data 311, representing the audio, to the system 120. The audio data 311 may include the detected wakeword, or the device 110 may remove the portion of the audio data, corresponding to the detected wakeword, prior to sending the audio data 311 to the system 120.

Referring to FIGS. 1 and 2, the orchestrator component 130 may be configured to, among other things, coordinate data transmissions between components of the system 120. The orchestrator component 130 may receive audio data from the device 110, and send the audio data to the ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data 311 with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to the NLU component 160.

The NLU component 160 processes the ASR output data or text data to determine one or more NLU hypotheses embodied in NLU output data. The NLU component 160 may perform intent classification (IC) processing on the ASR output data or text data to determine an intent of the natural language input. An intent corresponds to an action to be performed that is responsive to the natural language input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in ASR output data or text data to the words and phrases in an intents database. In some embodiments, the NLU component 160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 160 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 160 may be linked to one or more grammar frameworks with entity types to be populated with entity values. Each entity type of a grammar framework corresponds to a portion of ASR output data or text data that the NLU component 160 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data or text data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 160 may generate NLU output data including one or more NLU hypotheses, with each NLU hypothesis including an intent and optionally one or more entity types and corresponding entity values. In some embodiments, the NLU component 160 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component 160). In at least some embodiments, the system 120 may implement a spoken language understanding (SLU) component configured to process audio data 311 to determine NLU output data.

The SLU component may be equivalent to a combination of the ASR component 150 and the NLU component 160. Yet, the SLU component may process audio data 311 and directly determine the NLU output data, without an intermediate step of generating ASR output data. As such, the SLU component may take audio data 311 representing a spoken natural language input and attempt to make a semantic interpretation of the spoken natural language input. That is, the SLU component may determine a meaning associated with the spoken natural language input and then implement that meaning. For example, the SLU component may interpret audio data 311 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skill systems 125. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device

110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill 125, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 311. The user recognition component 195 may perform user recognition by comparing speech characteristics, in the audio data 311, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 3:
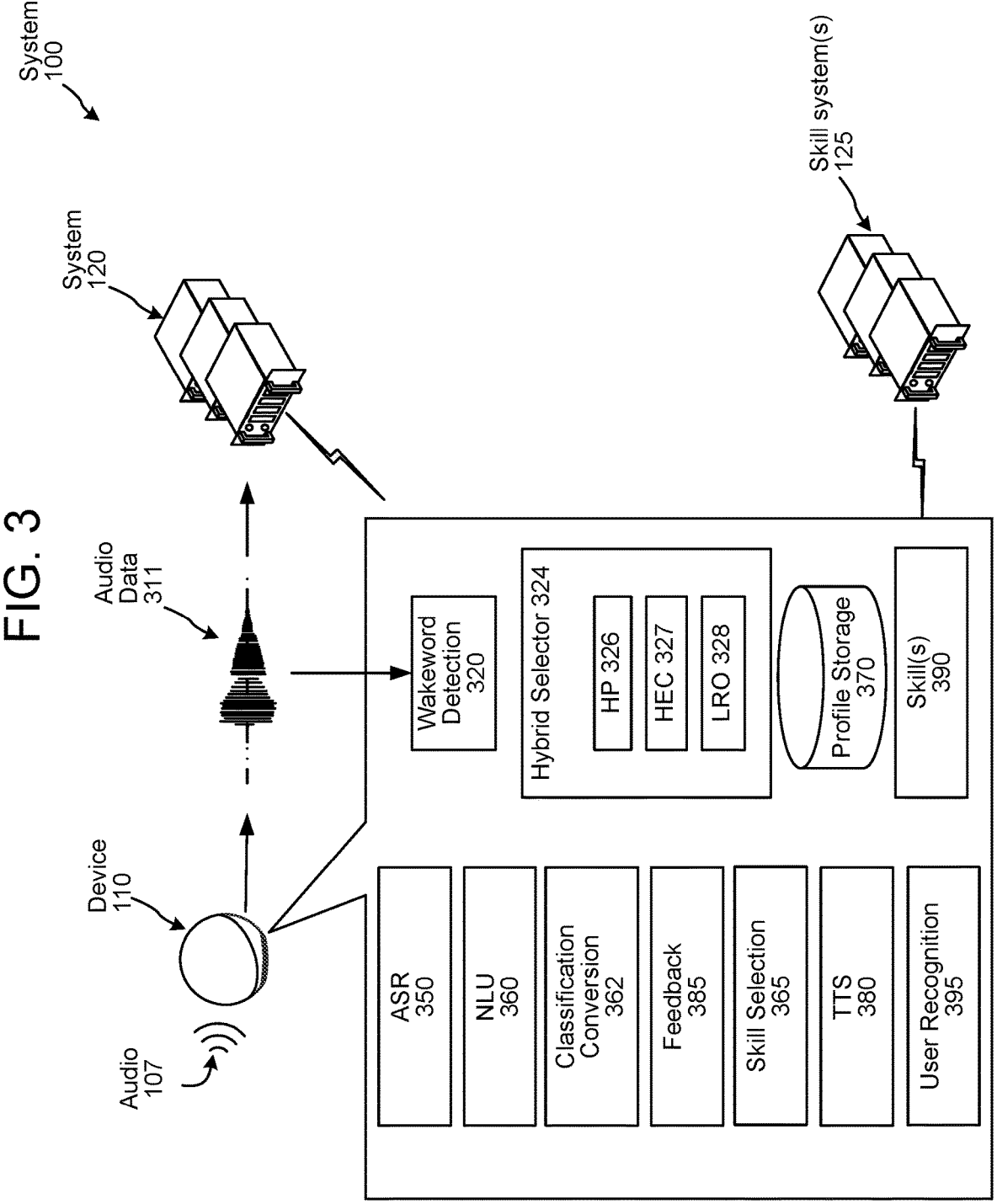
FIG. 3 is a conceptual diagram illustrating components that may be included in a device, according to embodiments of the present disclosure.

The foregoing describes illustrative components and processing of the system 120. The following describes illustrative components and processing of the device 110. As illustrated in FIG. 3, in at least some embodiments the system 120 may receive audio data 311 from the device 110, to recognize speech corresponding to a spoken natural language in the received audio data 311, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 320 configured to detect a wakeword (e.g., "Alexa") that indicates to the device 110 that the audio data 311 is to be processed for determining NLU output data. In at least some embodiments, a hybrid selector 324, of the device 110, may send the audio data 311 to the wakeword detection component 320. If the wakeword detection component 320 detects a wakeword in the audio data 311, the wakeword detection component 320 may send an indication of such detection to the hybrid selector 324. In response to receiving the indication, the hybrid selector 324 may send the audio data 311 to the system 120 and/or an on-device ASR component 350. The wakeword detection component 320 may also send an indication, to the hybrid selector 324, representing a wakeword was not detected. In response to receiving such an indication, the hybrid selector 324 may refrain from sending the audio data 311 to the system 120, and may prevent the on-device ASR component 350 from processing the audio data 311. In this situation, the audio data 311 can be discarded.

The device 110 may conduct its own speech processing using on-device language processing components, such as an on-device SLU component, an on-device ASR component 350, and/or an on-device NLU component 360 similar to the manner discussed above with respect to the speech processing system-implemented ASR component 150, and NLU component 160. The device 110 may also internally include, or otherwise have access to, other components such as one or more skill components 390 (which may process similar to the skill components 190), a TTS component 380 (which may perform processing similar to the TTS component 180), a classification conversion component 362 (which may perform processing similar to the classification conversion component 162), a skill selection component 365 (which may perform processing similar to the skill selection component 165), a feedback component 385 (which may perform processing similar to the feedback component 185), a user recognition component 395 (configured to process in a similar manner to the user recognition component 195), profile storage 370 (configured to store similar profile data to the profile storage 170), and other components. In at least some embodiments, the on-device profile storage 370 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 311 to pass to the system 120 while also receiving (e.g., intercepting) this audio data 311 and sending the audio data 311 to the HEC 327.

In at least some embodiments, the hybrid selector 324 may further include a local request orchestrator (LRO) 328 configured to notify the on-device ASR component 150 about the availability of the audio data 311, and to otherwise initiate the operations of on-device language processing when the audio data 311 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 311 is received, the HP 326 may allow the audio data 311 to pass through to the system 120 and the HP 326 may also input the audio data 311 to the on-device ASR component 150 by routing the audio data 311 through the HEC 327 of the hybrid selector 324, whereby the LRO 328 notifies the on-device ASR component 150 of the audio data 311. At this point, the hybrid selector 324 may wait for response data from either or both the system 120 and/or the on-device language processing components. However, the disclosure is not limited thereto, and in some examples the hybrid selector 324 may send the audio data 311 only to the on-device ASR component 150 without departing from the disclosure. For example, the device 110 may process the audio data 311 on-device without sending the audio data 311 to the system 120.

The on-device ASR component 350 is configured to receive the audio data 311 from the hybrid selector 324, and to recognize speech in the audio data 311, and the on-device NLU component 3 60 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 360) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 311 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

Figure 4:
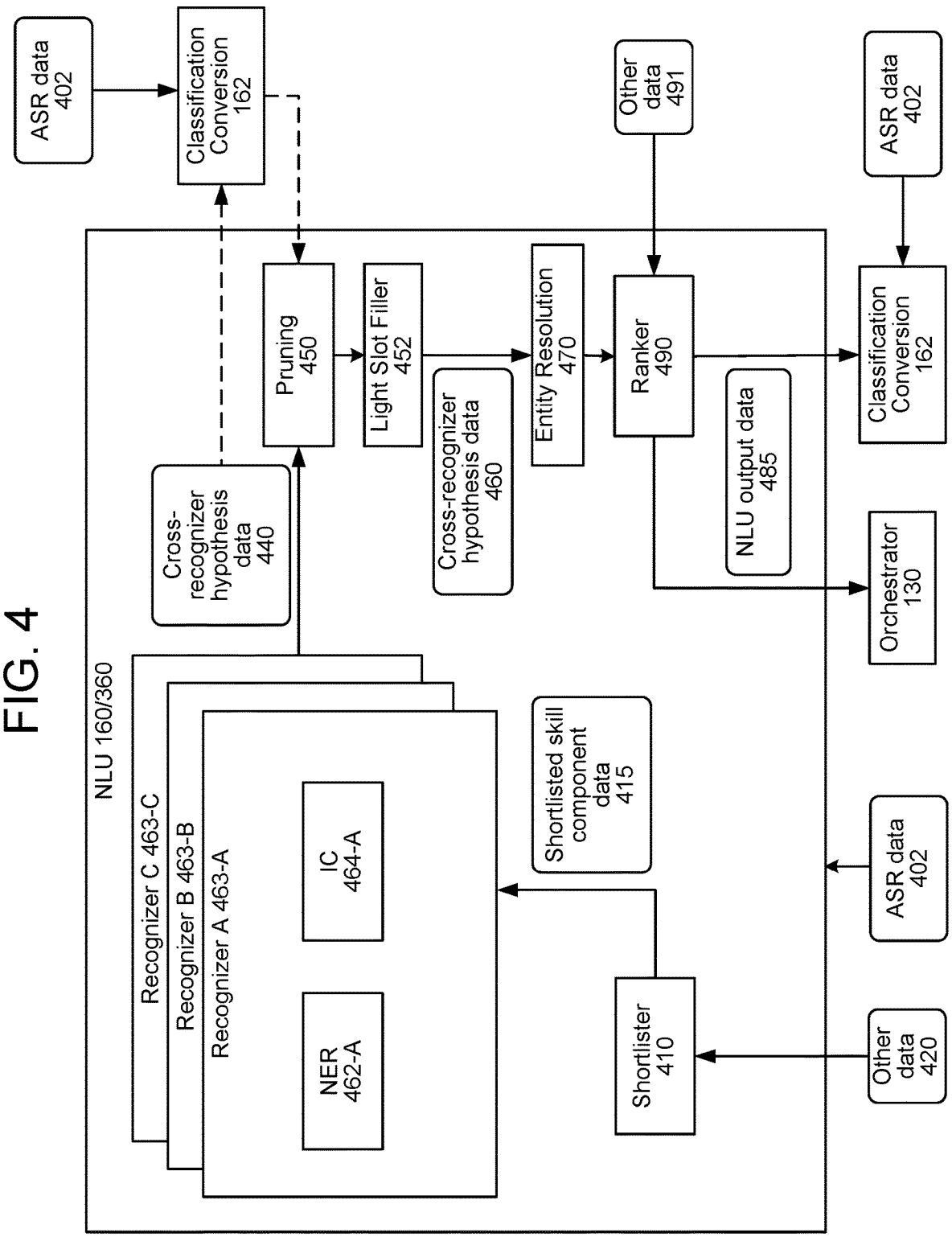
FIG. 4 is a conceptual diagram of how natural language understanding (NLU) processing may be performed, according to embodiments of the present disclosure.

Referring now to FIG. 4, it is described how NLU processing may be performed. The NLU component 160/360 may include one or more recognizers 463. In at least some embodiments, a recognizer 463 may be associated with a skill component 190/390 (e.g., the recognizer may be configured to interpret a natural language input to correspond to the skill component 190/390). In at least some other examples, a recognizer 463 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and/or a custom domain.

Recognizers 463 may process in parallel, in series, partially in parallel, etc. For example, a recognizer corresponding to a first domain may process at least partially in parallel to a recognizer corresponding to a second domain. For further example, a recognizer corresponding to a first skill component may process at least partially in parallel to a recognizer corresponding to a second skill component. In another example, a recognizer corresponding to a domain may process at least partially in parallel to a recognizer corresponding to a skill component.

The NLU component 160/360 may communicate with various storages. The NLU component 160/360 may communicate with an NLU storage, which includes skill component grammars, representing how natural language inputs may be formulated to invoke skill components 190/390, and skill component intents representing intents supported by respective skill components 190/390.

Each recognizer 463 may be associated with a particular grammar, one or more particular intents, and a particular personalized lexicon (stored in an entity library). A gazetteer may include skill component-indexed lexical information associated with a particular user. For example, Gazetteer A may include skill component-indexed lexical information. A user's music skill component lexical information might include album titles, artist names, and song names, for example, whereas a user's contact list skill component lexical information might include the names of contacts. Since every user's music collection and contact list is presumably different, this personalized information may improve entity resolution.

Each recognizer 463 may include a named entity recognition (NER) component 462 that attempts to identify grammars and lexical information that may be used to construe meaning with respect to text data input therein. A NER component 462 identifies portions of text data that correspond to a named entity that may be recognizable by the system 120/device 110. A NER component 462 may also determine whether a word refers to an entity that is not explicitly mentioned in the text, for example "him," "her," "it" or other anaphora, exophora or the like.

A NER component 462 applies grammar models and lexical information associated with one or more skill components 190/390 to determine a mention of one or more entities in text data input therein. In this manner, a NER component 462 identifies "slots" (i.e., particular words in text data) that may be needed for later processing. A NER component 462 may also label each slot with a type (e.g., noun, place, city, artist name, song name, etc.).

Each grammar model may include the names of entities (i.e., nouns) commonly found in natural language about a particular skill component 190/390 to which the grammar model relates, whereas lexical information may be personalized to the user identifier output by a user recognition component 190/390 for the natural language input. For example, a grammar model associated with a shopping skill component may include a database of words commonly used when people discuss shopping.

A downstream process called named entity resolution links a portion of input data (identified by a NER component 462) to a specific entity known to the system 120/device 110. To perform named entity resolution, the NLU component 160/360 may use gazetteer information stored in the entity library storage. The gazetteer information may be used to match text data (identified by a NER component 462) with different entities, such as song titles, contact names, etc. Gazetteers may be linked to users (e.g., a particular gazetteer may be associated with a specific user's music collection), may be linked to certain skill components 190/390 (e.g., a shopping skill component, a music skill component, a video skill component, a communications skill component, etc.), or may be organized in another manner.

Each recognizer 463 may also include an intent classification (IC) component 464 that processes text data input thereto to determine an intent(s) of a skill component(s) 190/390 that potentially corresponds to the natural language input represented in the text data. An intent corresponds to an action to be performed that is responsive to the natural language input represented by the text data. An IC component 464 may communicate with a database of words linked to intents. For example, a music intent database may link words and phrases such as "quiet," "volume off," and "mute" to a <Mute> intent. An IC component 464 identifies potential intents by comparing words and phrases in text data to the words and phrases in an intents database associated with the skill component(s) 190/390 that is associated with the recognizer 463 implementing the IC component 464.

The intents identifiable by a specific IC component 464 may be linked to one or more skill component-specific grammar frameworks with "slots" to be filled. Each slot of a grammar framework corresponds to a portion of text data that a NER component 462 believes corresponds to an entity. For example, a grammar framework corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks may not be structured as sentences, but rather based on associating slots with grammatical tags.

For example, a NER component 462 may identify words in text data as subject, object, verb, preposition, etc. based on grammar rules and/or models prior to recognizing named entities in the text data. An IC component 464 (implemented by the same recognizer 463) may use the identified verb to identify an intent. The NER component 462 may then determine a grammar model associated with the identified intent. For example, a grammar model for an intent corresponding to <PlayMusic> may specify a list of slots applicable to play the identified "object" and any object modifier (e.g., a prepositional phrase), such as {Artist Name}, {Album Name}, {Song name}, etc. The NER component 462 may then search corresponding fields in a lexicon, attempting to match words and phrases in the text data the NER component 462 previously tagged as a grammatical object or object modifier with those identified in the lexicon.

A NER component 462 may perform semantic tagging, which is the labeling of a word or combination of words according to their type/semantic meaning. A NER component 462 may parse text data using heuristic grammar rules, or a model may be constructed using techniques such as hidden Markov models, maximum entropy models, log linear models, conditional random fields (CRF), and the like. For example, a NER component 462, implemented by a music skill component or music domain recognizer 463, may parse and tag text data corresponding to "play mother's little helper by the rolling stones" as {Verb}: "Play," {Object}: "mother's little helper," {Object Preposition}: "by," and {Object Modifier}: "the rolling stones." The NER component 462 may identify "Play" as a verb based on a word database associated with the music skill component or music domain, which an IC component 464 may determine corresponds to a <PlayMusic> intent. At this stage, no determination has been made as to the meaning of "mother's little helper" and "the rolling stones," but based on grammar rules and models, the NER component 462 has determined that the text of these phrases relates to the grammatical object (i.e., entity).

The frameworks linked to the intent are then used to determine what database fields should be searched to determine the meaning of these phrases, such as searching a user's gazetteer for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve a slot/field using gazetteer information, the NER component 462 may search a database of generic words (in a knowledge base). For example, if the text data corresponds to "play songs by the rolling stones," after failing to determine an album name or song name called "songs" by "the rolling stones," the NER component 462 may search a music skill component vocabulary for the word "songs." In the alternative, generic words may be checked before the gazetteer information, or both may be tried, potentially producing two different results.

A recognizer 463 may tag text data to attribute meaning thereto. For example, a recognizer 463 may tag "play mother's little helper by the rolling stones" as: {skill component} Music, {intent} Play Music, {artist name} rolling stones, {media type} SONG, and {song title} mother's little helper. For further example, a recognizer 463 may tag "play songs by the rolling stones" as: {skill component} Music, {intent} Play Music, {artist name} rolling stones, and {media type} SONG.

As described above, more than one recognizer 463 may process with respect to ASR data 402 representing a single natural language input. In such instances, each recognizer 463 may output at least one NLU hypothesis including an intent indicator (determined by an IC component 464 of the recognizer 463) and at least one tagged named entity (determined by a NER component 462 of the recognizer 463).

The NLU component 160/360 may include a shortlister component 410. The shortlister component 410 selects skill components 190/390 that may execute in response to the natural language input. The shortlister component 410 thus limits downstream, more resource intensive NLU processes to being performed with respect to skill components 190/390 that are likely to execute in response to the natural language input.

Without a shortlister component 410, the NLU component 160/360 may process a given ASR hypothesis, included in the ASR data 402, (or the text data depending on the type of natural language input being processed) with respect to every skill component 190/390 of (or in communication with) the system 120, either in parallel, in series, or using some combination thereof. By implementing a shortlister component 410, the NLU component 160/360 may process a given ASR hypothesis included in the ASR data 402 with respect to only the skill components 190/390 that are likely to execute in response to the natural language input. This reduces total compute power and latency attributed to NLU processing.

The shortlister component 410 may include one or more machine learning (ML) models. The ML model(s) may be trained to recognize various forms of natural language inputs that may be received by the system 120/device 110. For example, during a training period a skill component 190/390 may provide the system 120/device 110 with training data representing sample natural language inputs that may be provided by a user to invoke the skill component 190/390. For example, a ride sharing skill component may provide the system 120/device 110 with training data including text corresponding to "get me a cab to [location]," "get me a ride to [location]," "book me a cab to [location]," "book me a ride to [location]," etc. The one or more ML models may be trained using the training data to determine other potentially related natural language input structures that a user may try to use to invoke the particular skill component 190/390. During training, the system 120/device 110 may query the skill component 190/390 regarding whether the determined other natural language input structures are permissible, from the perspective of the skill component 190/390, to be used to invoke the skill component 190/390 at runtime. The alternate natural language input structures may be derived by one or more ML models during model training and/or may be based on natural language input structures provided by different skill components 190/390. The skill component 190/390 may also provide the system 120/device 110 with training data indicating grammar and annotations. The system 120/device 110 may use the training data representing the sample natural language inputs, the determined related natural language input(s), the grammar, and the annotations to train a ML model that indicates when a runtime natural language input is likely to be directed to/handled by a particular skill component 190/390. Each ML model of the shortlister component 410 may be trained with respect to a different skill component 190/390. Alternatively, the shortlister component 410 may implement one ML model per skill component type, such as one ML model for weather skill components, one ML model for ride sharing skill components, etc.

The system 120/device 110 may use the sample natural language inputs provided by a skill component 190/390, and related sample natural language inputs determined during training, as binary examples to train a ML model associated with the skill component 190/390. The ML model associated with the particular skill component 190/390 may then be operated at runtime by the shortlister component 410. Some sample natural language inputs may be positive training examples (e.g., natural language inputs that may be used to invoke the skill component 190/390), whereas other sample natural language inputs may be negative training examples (e.g., natural language inputs that may not be used to invoke the skill component 190/390).

As described above, the shortlister component 410 may include a different ML model for each skill component 190/390, a different ML model for each skill component type, or some other combination of ML models. For example, the shortlister component 410 may alternatively include a single ML model. The single ML model may include a portion trained with respect to characteristics (e.g., semantic characteristics) shared by all skill components 190/390. The single ML model may also include skill component-specific portions, with each skill component-specific portion being trained with respect to a different skill component 190/390. Implementing a single ML model with skill component-specific portions may result in less latency than implementing a different ML model for each skill component 190/390 because the single ML model with skill component-specific portions limits the number of characteristics processed on a per skill component level.

The portion of the ML model, trained with respect to characteristics shared by more than one skill component 190/390, may be clustered based on skill component type. For example, a first portion, of the portion trained with respect to multiple skill components 190/390, may be trained with respect to weather skill components; a second portion, of the portion trained with respect to multiple skill components 190/390, may be trained with respect to music skill components; a third portion, of the portion trained with respect to multiple skill components 190/390, may be trained with respect to travel skill components; etc.

Clustering may not be beneficial in every instance because clustering may cause the shortlister component 410 to output indications of only a portion of the skill components 190/390 that the natural language input may relate to. For example, a natural language input may correspond to "tell me about Tom Collins." If the ML model is clustered based on skill component type, the shortlister component 410 may determine the natural language input corresponds to a recipe skill component (e.g., storing or otherwise having access to a drink recipe) even though the natural language input may also correspond to an information skill component (e.g., storing or otherwise having access to information about a person named Tom Collins).

Training the ML model(s) of the shortlister component 410 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The ML model(s) of the shortlister component 410 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 410 determines a natural language input is associated with multiple skill components 190/390, only the recognizers 463 associated with those skill components 190/390 may process with respect to the natural language input. The selected recognizers 463 may process in parallel, in series, partially in parallel, etc. For example, if the shortlister component 410 determines a natural language input may relate to both a communications skill component and a music skill component, a recognizer 463 associated with the communications skill component may process in parallel, or partially in parallel, with a recognizer 463 associated with the music skill component processing.

The shortlister component 410 may make binary determinations (e.g., yes or no) regarding which skill component(s) 190/390 corresponds to a natural language input. The shortlister component 410 may make such determinations using the one or more ML models described herein above. If the shortlister component 410 implements a single ML model for each skill component 190/390, the shortlister component 410 may simply run the ML models that are associated with enabled skill components 190/390 as indicated in a profile (e.g., stored in the profile storage 170/370) associated with the device 110 and/or user 105 that originated the natural language input.

The shortlister component 410 may generate shortlisted skill component data 415 representing one or more skill components 190/390 that may execute in response to the user input. The number of skill components 190/390 represented in the shortlisted skill component data 415 is configurable. In an example, the shortlisted skill component data 415 may indicate every skill component 190/390 of (or otherwise in communication with) the system 120/device 110 as well as contain an indication, for each skill component 190/390, representing whether the skill component 190/390 is likely capable of processing in response to the natural language input. In another example, instead of indicating every skill component 190/390, the shortlisted skill component data 415 may only indicate the skill components 190/390 that are likely capable of processing in response to the natural language input. In yet another example, the shortlister component 410 may implement thresholding such that the shortlisted skill component data 415 may indicate no more than a maximum number of skill components 190/390 that may process in response to the natural language input.

In at least some embodiments, the shortlister component 410 may generate a score representing how likely a skill component 190/390 is likely to process in response to a user input. In such embodiments, the shortlisted skill component data 415 may only include identifiers of skill components 190/390 associated with scores meeting or exceeding a threshold score.

In the situation where the ASR component 150/350 outputs ASR data 402 including more than one interpretation of a spoken input, the shortlister component 410 may output different shortlisted skill component data 415 for each interpretation. Alternatively, the shortlister component 410 may output a single shortlisted skill component data 415 representing the skill components 190/390 corresponding to the different interpretations.

As indicated above, the shortlister component 410 may implement thresholding such that the shortlisted skill component data 415 may indicate no more than a threshold number of skill components 190/390 (e.g., may include no more than a threshold number of skill component identifiers). If the ASR component 150/350 outputs ASR data 402 including more than one interpretation of a natural language input, the shortlisted skill component data 415 may indicate no more than a threshold number of skill components 190/390 irrespective of the number of interpretations output by the ASR component 150/350. Alternatively or in addition, the shortlisted skill component data 415 may indicate no more than a threshold number of skill components 190/390 for each interpretation (e.g., indicating no more than five skill components 190/390 for a first interpretation, no more than five skill components 190/390 for a second interpretation, etc.).

In addition to making a binary determination regarding whether a skill component 190/390 may process in response to a natural language input, the shortlister component 410 may generate scores representing likelihoods that skill components 190/390 may process in response to the natural language input. If the shortlister component 410 implements a different ML model for each skill component 190/390, the shortlister component 410 may generate a different confidence score for each skill component-specific ML model that is run by the shortlister component 410. For example, if the shortlister component 410 runs the ML models of every skill component 190/390 of (or otherwise in communication with) the system 120/device 110, the shortlister component 410 may generate a respective confidence score for each skill component 190/390. For further example, if the shortlister component 410 only runs ML models specific to skill components 190/390 that are indicated as enabled in a profile associated with the device 110 and/or user 105 (as stored in the profile storage 170/370), the shortlister component 410 may only generate a respective confidence score for each enabled skill component 190/390. For further example, if the shortlister component 410 implements a single ML model with skill component-specific portions, the shortlister component 410 generate a respective confidence score for each skill component 190/390 who's specifically trained portion is run. The shortlister component 410 may perform matrix vector modification to obtain confidence scores for skill components 190/390.

An example of shortlisted skill component data 415 including confidence scores may be represented as:
Search skill component, 0.67
Recipe skill component, 0.62
Information skill component, 0.57

As indicated, the confidence scores output by the shortlister component 410 may be numeric values. The confidence scores output by the shortlister component 410 may alternatively be binned values (e.g., high, medium, low).

The shortlister component 410 may consider other data 420 when determining which skill components 190/390 may process in response to a natural language input. The other data 420 may be character embedded prior to being input to the shortlister component 410. The other data 420 may alternatively be embedded using other techniques.

The other data 420 may include usage history data associated with the device 110 and/or user 105. For example, a confidence score of a skill component 190/390 may be increased if natural language inputs captured by the device 110 and/or originating from the user 105 routinely relate to the skill component 190/390. Conversely, a confidence score of a skill component 190/390 may be decreased if natural language inputs captured by the device 110 and/or originated from the user 105 rarely relate to the skill component 190/390.

The other data 420 may indicate the skill components 190/390 that are enabled with respect to the device 110 and/or user 105 (e.g., as represented in the profile storage 170/370). The shortlister component 410 may use such data to determine which skill component-specific ML models to run. That is, the shortlister component 410 may determine to only run the ML models associated with enabled skill components 190/390. The shortlister component 410 may alternatively use such data to alter skill component confidence scores represented in the shortlisted skill component data 415. As an example, considering two skill components 190/390, one enabled and another unenabled, the shortlister component 410 may run a first ML model (or ML model portion) specific to the unenabled skill component as well as a second ML model (or ML model portion) specific to the enabled skill component. The shortlister component 410 may initially determine a confidence score of 0.60 for each of the unenabled skill component and the enabled skill component. The shortlister component 410 may then alter those confidence scores based on which skill component is enabled. For example, the shortlister component 410 may increase the confidence score associated with the enabled skill component and/or decrease the confidence score associated with the unenabled skill component.

A user 105 may provide the system 120 with indications of which skill components 190/390 are enabled (e.g., authorized to execute using data associated with the user 105). Such indications may be stored in the profile storage 170/370. The shortlister component 410 may determine whether profile data associated with the user 105 and/or device 110 that originated the natural language input includes indications of enabled skill components 190/390.

The other data 420 may indicate a type of the device 110. The type of the device 110 may indicate the input/output capabilities of the device 110. For example, the device 110 may include a display, may be headless (e.g., displayless), may be mobile or stationary, may include audio playback capabilities, may include a camera, etc. The shortlister component 410 may use such other data 420 to determine which skill component-specific ML models (or ML model portions) to run. For example, if the device 110 is displayless, the shortlister component 410 may determine not to run ML models (or ML model portions) specific to skill components 190/390 that output video data. The shortlister component 410 may alternatively use such other data 420 to alter skill component confidence scores represented in the shortlisted skill component data 415. As an example, considering two skill components 190/390, one that outputs audio data and another that outputs video data, the shortlister component 410 may run a first ML model (or portion of a ML model) specific to the skill component that generates audio data as well as a second ML model (or portion of a ML model) specific to the skill component that generates video data. The shortlister component 410 may initially determine a confidence score of 0.60 for each of the skill components. The shortlister component 410 may then alter the original confidence scores based on the type of the device 110. For example, if the device 110 is displayless, the shortlister component 410 may increase the confidence score associated with the skill component that generates audio data and/or decrease the confidence score associated with the skill component that generates video data.

The type of device data represented in the other data 420 may represent output capabilities of the device 110 to be used to output content to the user 105, which may not necessarily be the device 110 that captured the natural language input. For example, a displayless device 110 may receive a natural language input corresponding to "play Game of Thrones". The system 120/device 110 may determine a smart TV, or other device including or otherwise associated with a display, is to be used to output multimedia content (e.g., audio and video) corresponding to the title "Game of Thrones".

The other data 420 may include data indicating a speed of the device 110, a location of the device 110, or other mobility data. For example, the device 110 may correspond to a vehicle including a display. If the vehicle is moving, the shortlister component 410 may decrease the confidence score associated with a skill component 190/390 that generates video data as it may be undesirable to output video content to the user 105 while in a moving vehicle. The vehicle may output data to the system 120 indicating when the vehicle is in motion.

The other data 420 may include data indicating a currently invoked skill component 190/390 (e.g., a skill component 190/390 that was processing to output content to the user 105 when the device 110 received the natural language input). For example, the user 105 may speak a first (e.g., a previous) natural language input causing the system 120 to invoke a music skill component to output music to the user 105. As the music is being output to the user 105, the system 120 may receive a second (e.g., a current) natural language input. The shortlister component 410 may use such other data 420 to alter skill component confidence scores represented in the shortlisted skill component data 415. For example, the shortlister component 410 may run a first ML model (or ML model portion) specific to a first skill component as well as a second ML model (or ML model portion) specific to a second skill component. The shortlister component 410 may initially determine a confidence score of 0.60 for each of the first and second skill components. The shortlister component 410 may then alter the original confidence scores based on the first skill component being invoked to output content while the current natural language input was received. Based on the first skill component being invoked, the shortlister component 410 may increase the confidence score associated with the first skill component and/or decrease the confidence score associated with the second skill component.

The thresholding implemented with respect to the shortlisted skill component data 415 and the different types of other data 420 considered by the shortlister component 410 are configurable. For example, the shortlister component 410 may update confidence scores as more other data 420 is considered.

The shortlister component 410 may cause the NLU component 160/360 to invoke only a subset of the recognizers 463 associated with skill components 190/390 represented in the shortlisted skill component 415 as being likely to process in response to the natural language input. If the shortlister component 410 generates the shortlisted skill component data 415 to include confidence scores, the shortlister component 410 may cause the NLU component 160/360 to invoke only recognizers 463 associated with skill components 190/390 associated with confidence scores satisfying (e.g., meeting or exceeding) a condition (e.g., a threshold confidence score).

The NLU component 160/360 may compile NLU hypotheses, output by multiple recognizers 463, into cross-recognizer hypothesis data 440 (illustrated in FIG. 4). Each NLU hypothesis may be associated with a respective score indicating a likelihood that the NLU hypothesis corresponds to the domain, one or more skill components 190/390, etc. associated with the recognizer 463 from which the NLU hypothesis was output. For example, the cross-recognizer hypothesis data 440 may be represented as, with each line corresponding to a different NLU hypothesis:

[0.95] Intent: <PlayMusic> AlbumName: GameOfThrones

[0.70] Intent: <Play Video> VideoTitle: GameOfThrones.

While the foregoing illustrates cross-recognizer hypothesis data 440 include two NLU hypotheses, it will be appreciated that the cross-recognizer hypothesis data 440 may include differing numbers of NLU hypotheses with departing from the present disclosure.

The NLU component 160/360 may send the cross-recognizer hypothesis data 440 to a pruning component 450, which sorts the NLU hypotheses, represented in the cross-recognizer hypothesis data 440, according to their respective scores. The pruning component 450 may then perform score thresholding with respect to the cross-recognizer hypothesis data 440. For example, the pruning component 450 may select NLU hypotheses, represented in the cross-recognizer hypothesis data 440, associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may generate cross-recognizer hypothesis data 460 including the selected NLU hypotheses. The purpose of the pruning component 450 is to create a reduced list of NLU hypotheses so that downstream, more resource intensive, processes may only operate on NLU hypotheses that most likely represent the natural language input.

The NLU component 160/360 may include a light slot filler component 452 that takes text from slots, represented in the NLU hypotheses output by the pruning component 450, and alters it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill component 190/390, domain, etc. to which a NLU hypothesis relates. For example, for a travel skill component-specific NLU hypothesis, the entity resolution component 470 may transform text corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text. Referring to the example natural language input "play songs by the stones," the entity resolution component 470 may reference a personal music catalog, a user profile, or the like (for example stored in the profile storage 170/370). The entity resolution component 470 may output NLU hypotheses, altered from the cross-recognizer hypothesis data 460, that include more detailed information (e.g., entity identifiers) about the specific entities mentioned in the slots and/or more detailed slot data that can eventually be used by a skill component 190/390 to perform an action responsive to the natural language input. The NLU component 160/360 may include multiple entity resolution components 470 that are each specific to one or more different skill components 190/390, domains, etc.

The NLU component 160/360 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also other data 491. The other data 491 may include a variety of data.

For example, the other data 491 indicate skill component 190/390 rating or popularity. For example, if a skill component 190/390 has a high rating, the ranker component 490 may increase the score of a NLU hypothesis associated with that skill component 190/390, and vice versa.

The other data 491 may indicate skill components 190/390 that have been enabled by the user 105. For example, the ranker component 490 may assign higher scores to NLU hypotheses associated with enabled skill components than NLU hypotheses associated with skill components that have not been enabled by the user 105.

The other data 491 include system usage history (e.g., specific to the user 105), such as if the user 105 regularly invokes a particular skill component 190/390 or does so at particular times of day. The other data 491 may indicate a present date, a present time, location of the device 110, weather data, a type of the device 110, a user identifier of the user 105, context data, as well as other data. For example, the ranker component 490 may consider when any particular skill component 190/390 is currently active with respect to the present user 105 and/or device 110 (e.g., music being output by the skill component 190/390 when the current natural language input is received).

The ranker component 490 may output NLU output data 485 including one or more NLU hypotheses. The NLU component 160/360 may send the NLU output data 485 to the classification conversion component 162 for further processing as described above in relation to FIGS. 1 and 2. The NLU output data 485 may also be sent to the orchestrator component 130 for further processing as described in relation to FIGS. 1 and 2.

In some embodiments, the cross-recognizer hypothesis data 440 may be provided to the classification conversion component 162 for processing. Based on the domain(s) and/or intent(s) indicated in the cross-recognizer hypothesis data 440, the classification conversion component 162 may use one or more generator models (described in relation to FIG. 6) to process the ASR data 402 corresponding to a user input received by the device 110, and to determine whether the domain(s) and/or intent(s) in the cross-recognizer hypothesis data 440 correspond to the user input or not. In other embodiments, the classification conversion component 162 may receive the NLU output data 485, may use one or more generator models to determine to process the ASR data 402 corresponding to a user input received by the device 110, and may determine whether the domain(s) and/or intent(s) in the NLU output data 485 correspond to the user input or not.

Figure 5:
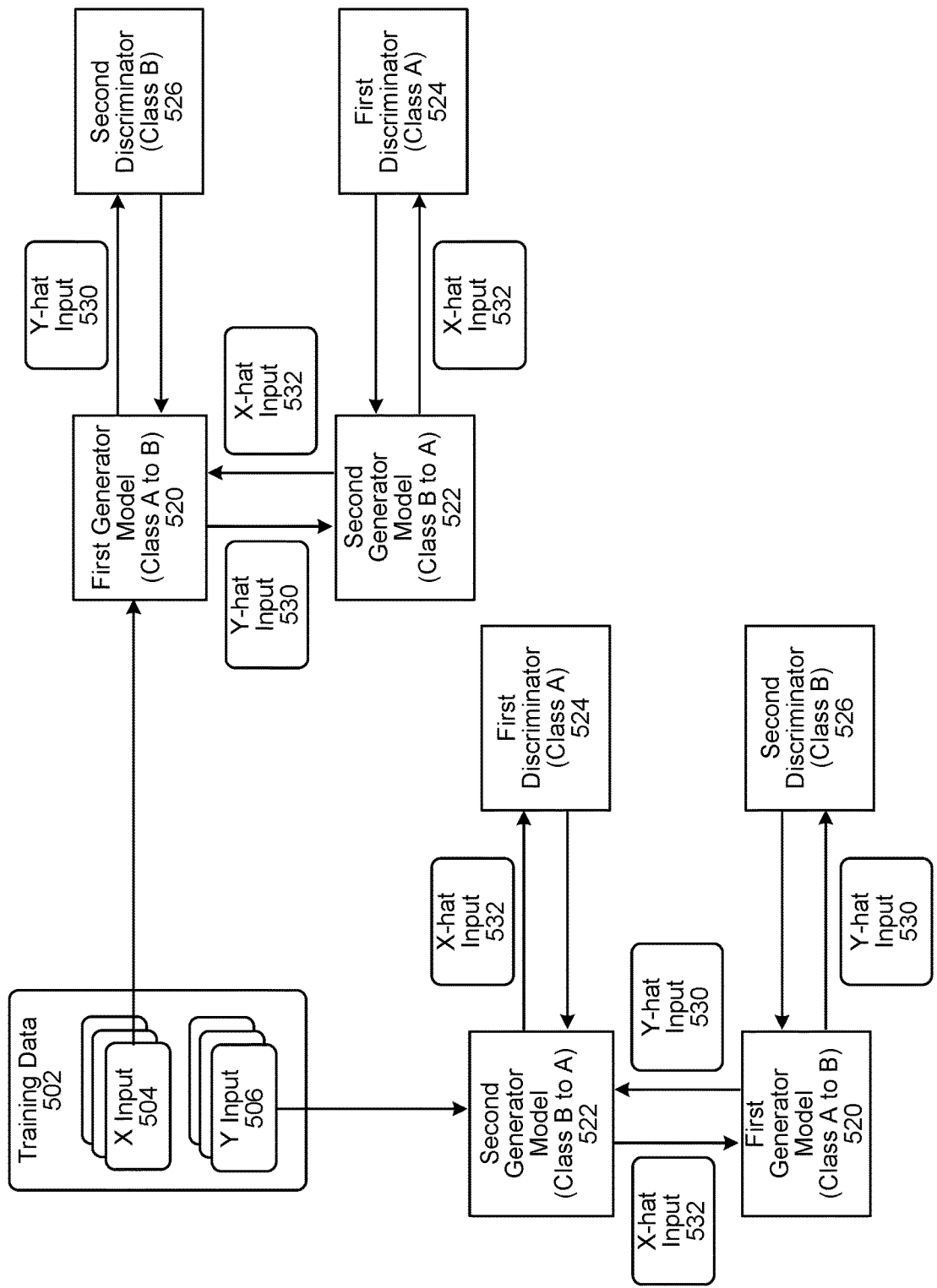
FIG. 5 is a conceptual diagram illustrating how generator models can be configured, according to embodiments of the present disclosure.

FIG. 5 is a conceptual diagram illustrating how generator models can be configured. In some embodiments, a generator model is a neural network configured using unsupervised or semi-supervised training techniques and training data 502 including samples, X input 504, corresponding to a first class A and samples, Y input 506, corresponding to a second class B. The training data 502 may not include class labels for the X input 504 and the Y input 506. Rather the generator models may automatically learn which inputs belong to which class. Some embodiments use what is referred to herein as cycle consistency loss for configuring the generator model. The cycle consistency loss involves having two different generator models-a first generator model 520 (Class A to B) that transforms an input corresponding to class A to a machine-generated input corresponding to class B, and a second generator model 522 (Class B to A) that transforms an input corresponding to class B to a machine-generated input corresponding to class A. The first and second generator models 520, 522 can be trained via a combination of generative adversarial networks, which in addition to the generator models 520, 522 also involve have two discriminator models-a first discriminator model 524 being able to identify samples corresponding to class A, and a second discriminator model 526 being able to identify samples corresponding to class B.

In some embodiments, the system additionally uses a similarity loss L_sima and L_simb, which is added to the overall training loss in a cycle architecture, to ensure that the machine-generated inputs from the first and second generator models 520, 522 are penalized if they are too different from the original input. The similarity loss in this case is based on the difference in number of words and edit distance within the non-exact matching words, so that generations closer to the original input are less penalized than machine-generated inputs that change a lot in the original input sentence.

The difficulty of building generator models that are able to learn the kind of transformations described herein is that usually there is no parallel data of the original input and the counterfactual available. To overcome this, cycle consistency loss is used for the task of explaining class correspondence of user inputs. The system uses a combination of multiple machine learning models (e.g., neural networks) that work in a concerted effort to solve the task. Given the classes, the system uses two different generator models that are trained for the task of converting an input from one class into another class, and the other way around. To learn this task without parallel training examples, discriminator models (e.g., neural networks) are additionally used that are trained on distinguishing real examples of a class from non-class examples. With these models in place several computations can be done on the samples in the training data 502, where X input 504 corresponds to class A and Y input 506 corresponds to class B. Below are example computations that may be performed, where Ga_b is the first generator model 520, Gb_a is the second generator model 522, d_a is the first discriminator 524, d_b is the second discriminator 526:

Y-hat 530=Ga_b (X input 504)—the sample that should be in Class B and is generated using X input 504

X-hat 532=Gb_a (Y input 506)—the sample that should be in Class A and is generated using Y input 506

~x=Gb_a (Ga_b (X input 504)—mapping back the sample generated to be in Class B back to a sample in Class A ~y=Ga_b (Gb_a (Y input 506)—mapping back the sample generated to be in Class A back to a sample in Class B Dis_a=d_a (x-hat 532)—probability according to the first discriminator 524 for the second generator model 522 indicating that the generated sample is really in Class A Dis_b=d_b (y-hat 530)—probability according to the second discriminator 526 for the first generator model 520 indicating that the generated sample is really in Class B id (x, y)—difference between two inputs sim (x, y)—similarity between two inputs, with minimum one-word difference With the above definitions in place, the generator models 520, 522 are trained in two steps. In the first generation step: for two samples, one from each class, ~x, ~y are computed and with them a weighted loss over the sum: {dis_a, dis_b, id (x, ~x), id (y, ~y), sim (y, x-hat), sim (x, y-hat). This forces the generator models 520, 522 to: a) fool the discriminators 524, 526 (generate inputs that look like they belong to the other class); b) regenerate the original user input via a cycle; and c) the machine-generated input in the other class should differ very little from the original input. In the second discriminative step, the discriminators 524, 526 are trained on samples from X input 504 and Y input 506, and samples of the machine-generated inputs to enable distinguishing machine-generated inputs from original inputs. These two steps are done in an alternating manner to make sure both, the generative and the discriminative process improve over time.

After training, the first and second generator models 520, 522 are used by the system 120 to transform a user input from one class into a machine-generated input of another class. Then, the difference between the machine-generated input and the original input may be identified as the "important part" that causes the original input to be part of the class. If no change is made to the original input, then this input may be a candidate for relabeling/further investigation whether there was an error in the original class assigned to the input.

Example training data for training a generator model to convert inputs corresponding to a first domain to machine-generated inputs corresponding to a second domain may include first unlabeled samples corresponding to the first domain and second unlabeled samples corresponding to the second domain, and using the above training techniques, the generator model learns automatically which samples correspond to which domain. As another example, training data for training a generator model to convert inputs corresponding to a positive sentiment to machine-generated inputs corresponding to a neutral sentiment may include first unlabeled samples corresponding to positive sentiment class and second unlabeled samples corresponding to neutral sentiment class.

FIG. 6 is a conceptual diagram illustrating components of the classification conversion component 162. As described herein, the classification conversion component 162 may include multiple generator models 163 (shown in FIG. 1), for example, a first generator model 620 configured to convert inputs of Class A to machine-generated inputs of Class B, a second generator model 622 configured to convert inputs of Class B to machine-generated inputs of Class A, a third generator model 630 configured to convert inputs of Class C to machine-generated inputs of Class D, and a fourth generator model 632 configured to convert inputs of Class D to machine-generated inputs of Class C. Fewer or more generator models than shown may be included. As described herein, a class may refer to a label or category that may be assigned/predicted for a user input received by the system 120/the device 110. Herein a class may be a domain, an intent, a sentiment, or other classes. For example, the first generator model 620 may be configured to convert inputs of a first domain to machine-generated inputs of a second domain.

The classification conversion component 162 may include a generator selector component 610 configured to select one or more generator models to be used to process input data 602. The input data 602 may be ASR data representing a spoken natural language input, where the ASR data may be text data, token data, or one or more ASR hypotheses including text data or token data and a corresponding confidence score. The input data 602 may be determined by the ASR component 150/350. In some embodiments, the input data 602 may be received from the ASR component 150/350, the NLU component 160/360, the feedback component 185/385, or another component of the system 120/device 110. In some embodiments, the input data 602 may be word embedding data corresponding to one or more words included in the user input received by the system 120/device 110.

The classification conversion component 162 may also receive other data 604 from the NLU component 160/360, the feedback component 185/385, or another component of the system 120/device 110. The other data 604 may include a representation (e.g., text data, identifier, etc.) of a class (e.g., a domain, an intent, a sentiment, etc.) corresponding to the input data 602. Alternatively or additionally, the other data 604 may include a command indicating which generator model is to be used, or a command indicating a class of interest/desired class. For example, the other data 604 may include a command to use a generator model that converts inputs of a first domain to machine-generated inputs of a second domain. As another example, the other data 604 may include an identifier for a generator model.

The generator selector component 610 may use rules data or other data, which may be stored in a database, a table, or other data structure, to determine which generator models to use to process the input data 602. Based on the other data 604, the generator selector component 610 may select one or more generator models. For example, the generator selector component 610 may select a generator model indicated in the other data 604. As another example, the generator selector component 610 may select a generator model based on the class, corresponding to the input data 602, indicated in the other data 604. For example, the generator selector component 610 may select a generator model configured to convert inputs of a positive sentiment or a negative sentiment to machine-generated inputs of a neutral sentiment based on the input data 602 corresponding to a positive or negative sentiment class. In other embodiments, the generator selector component 610 may select a generator model based on which component is requesting the classification conversion component 162 to operate. For example, if the command/request is provided by the feedback component 185, then the classification conversion component 162 may select a generator model configured to convert inputs of a positive sentiment or a negative sentiment to machine-generated inputs of a neutral sentiment based on the input data 602 corresponding to a positive or negative sentiment class.

The generator selector component 610 may send the input data 602 to the selected one or more generator models (e.g., 620, 622, 630, 632, etc.) for processing. The generator model may process the input data 602, and may output machine-generated input data 640. In some cases, the input data 602 may correspond to a first class, and the machine-generated input data 640 may correspond to a second different class. In some cases, the machine-generated input data 640 may correspond to the same class/class A as the input data 602, if the generator model is configured to convert inputs of a different class/class B to machine-generated inputs of class A and the input data 602 already corresponds to class A, then the machine-generated input data 640 may be the same as the input data 602. The machine-generated input data 640 may be text data or token data representing one or more words. The generator model may replace one or more words in the input data 602 to determine the machine-generated input data 640, may delete one or more words in the input data 602 to determine the machine-generated input data 640, or may add one or more words to the input data 602 to determine the machine-generated input data 640.

For an example generator model configured to convert inputs corresponding to a positive sentiment class to machine-generated inputs corresponding to a neutral sentiment class, an example input may be "I watched this awesome movie last night!" and the machine-generated input may be "I watched this movie last night." Thus the generator model removes "awesome" and "!" to convert the input to a neutral sentiment class. For an example generator model configured to convert inputs corresponding to a positive sentiment class to machine-generated inputs corresponding to a negative sentiment class, an example input may be "I am happy I passed the exam" and the machine-generated input may be "I am sad I failed the exam." Thus the generator model replaces "happy" with "sad" and "passed" with "failed" to convert the input to a negative sentiment class.

The classification conversion component 162 may include a comparison component 650 configured to process the input data 602 with respect to the machine-generated input data 640. The comparison component 650 may determine one or more portions of the input data 602 that is different than one or more portions of the machine-generated input data 640, and may output portion(s) of the input data 652 that are different. The portion(s) of input data 652 may be text data or token data. For example, the input data 602 may be text data representing "Tell me information about [object]", the machine-generated input data 640 may be text data representing "Show me information about [object]", and the portion(s) of input data 652 may be text data representing "Tell me." The comparison component 650 may determine differences between the input data 602 and the machine-generated input data 640 at an embedding-level or at a word-level.

The comparison component 650 may output the machine-generated input data 640 and the portion(s) of input data 652 if there are differences between the input data 602 and the machine-generated input data 652. In some embodiments, the comparison component 650 may output other data 654, which may be an indication (e.g., text data, identifier, etc.) of the class (e.g., a domain, an intent, a sentiment, etc.) corresponding to the machine-generated input data 640. The other data 654 may also or instead be an indication of whether or not there are differences between the input data 602 and the machine-generated input data 640.

In some embodiments, the classification conversion component 162 may be configured to process audio data, and the generator models may be configured to convert input audio data corresponding to a first class to machine-generated audio data corresponding to a second class. For example, input audio data representing speech "I am fine" corresponding to a positive sentiment (e.g., in a happy tone) may be processed by a generator model, configured to convert inputs from positive sentiment to machine-generated inputs of negative sentiment, to determine machine-generated audio data representing speech "I am fine" corresponding to a negative sentiment (e.g., in a sad tone). In example embodiments, the generator model may learn the tone, pitch, prosody, and/or other voice/audio characteristics that classifies an input to a positive sentiment or a negative sentiment.

In some embodiments, the classification conversion component 162 may be configured to process image data, and the generator models may be configured to convert input image data corresponding to a first class to machine-generated image data corresponding to a second class. In other embodiments, the classification conversion component 162 may be configured to process other types of data.

Figure 7:
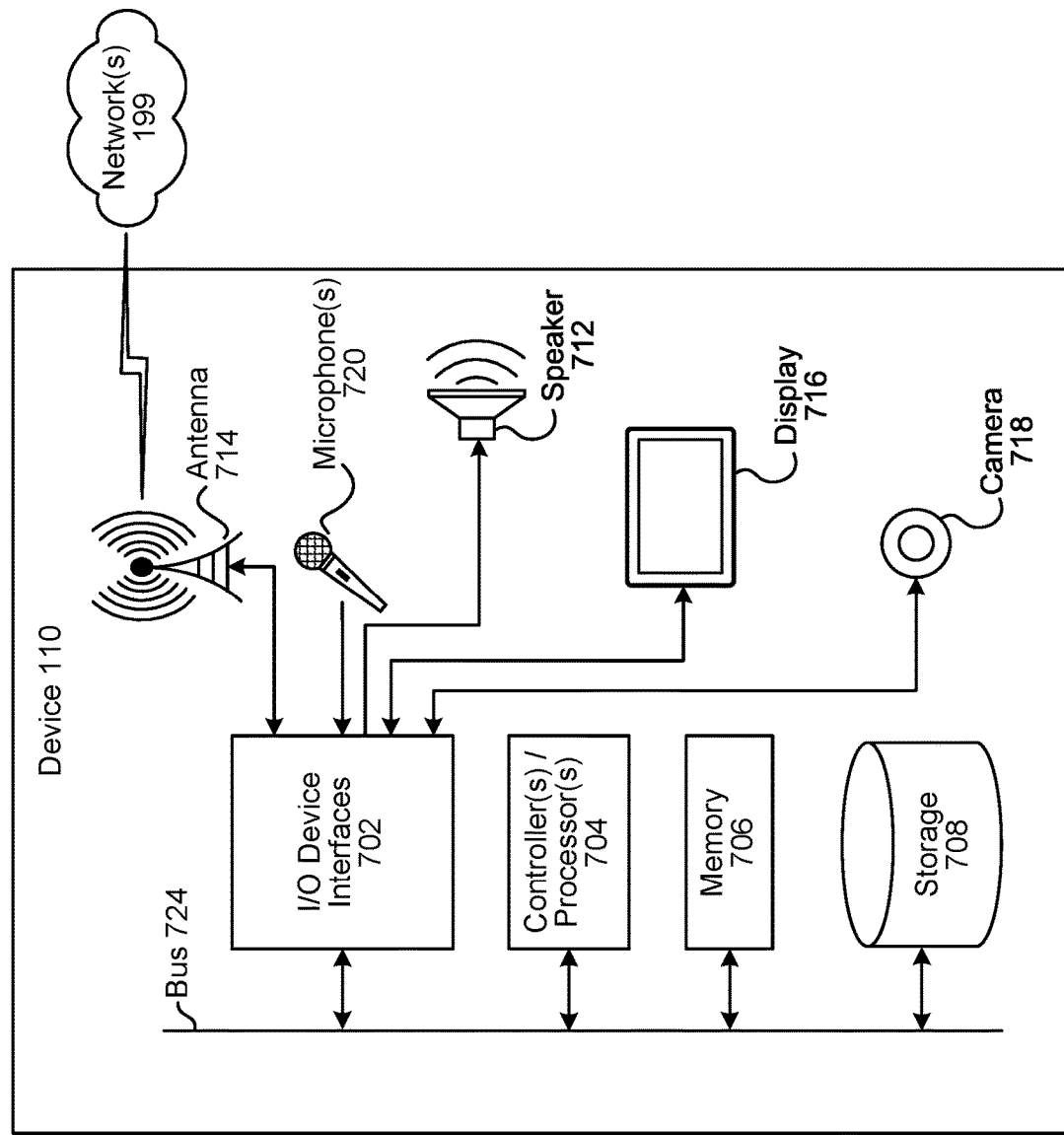
FIG. 7 is a block diagram conceptually illustrating example components of a device, according to embodiments of the present disclosure.
Figure 8:
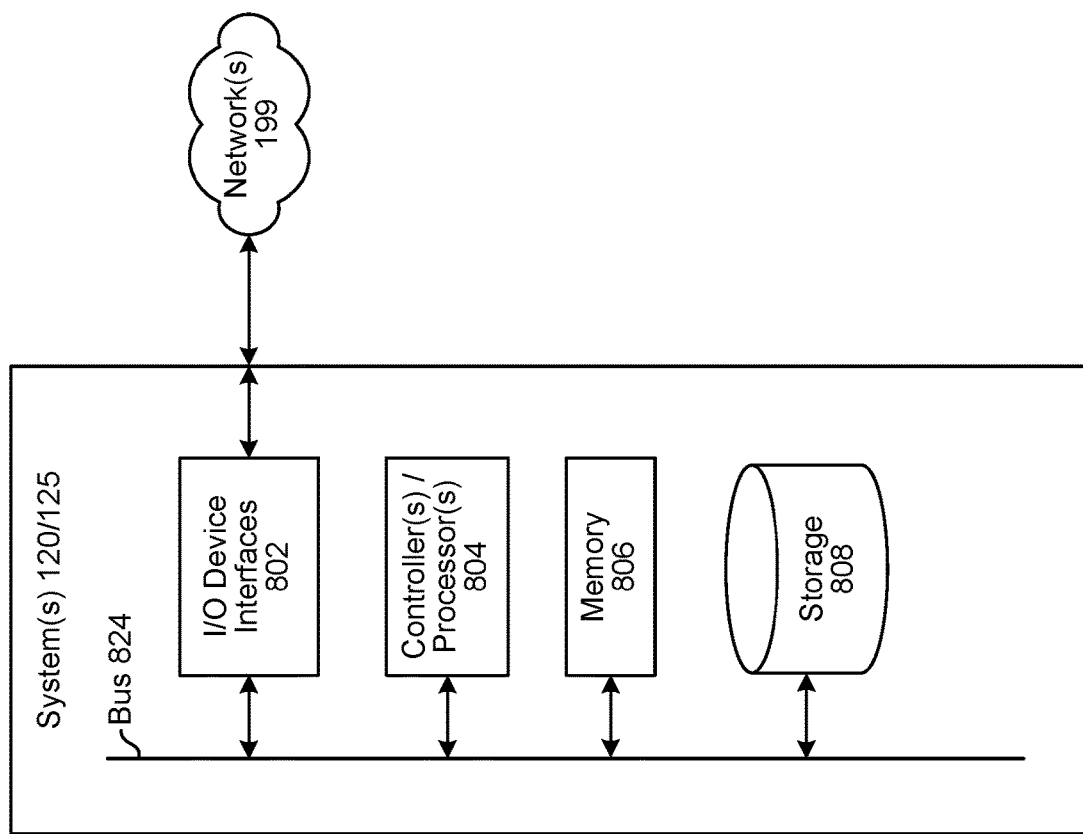
FIG. 8 is a block diagram conceptually illustrating example components of a system, according to embodiments of the present disclosure.

FIG. 7 is a block diagram conceptually illustrating a device 110 of the system 100. FIG. 8 is a block diagram conceptually illustrating example components of a remote device, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (702/802).

Computer instructions for operating each device (110/120/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/125) includes input/output device interfaces (702/802). A variety of components may be connected through the input/output device interfaces (702/802), as will be discussed further below. Additionally, each device (110/120/125) may include an address/data bus (724/824) for conveying data among components of the respective device. Each component within a device (110/120/125) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, and/or skill 125 may include their own dedicated processors, memory, and/or storage. Alternatively, one or more of the components of the device 110, the system 120, and/or skill 125 may utilize the I/O interfaces (702/802), processor(s) (704/804), memory (706/806), and/or storage (708/808) of the device 110, the system 120, and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120, and the skill 125, as described herein, are illustrative, and may be located as a stand-alone device or may be included, in whole or in part, as a component of a larger device or system.

Figure 9:
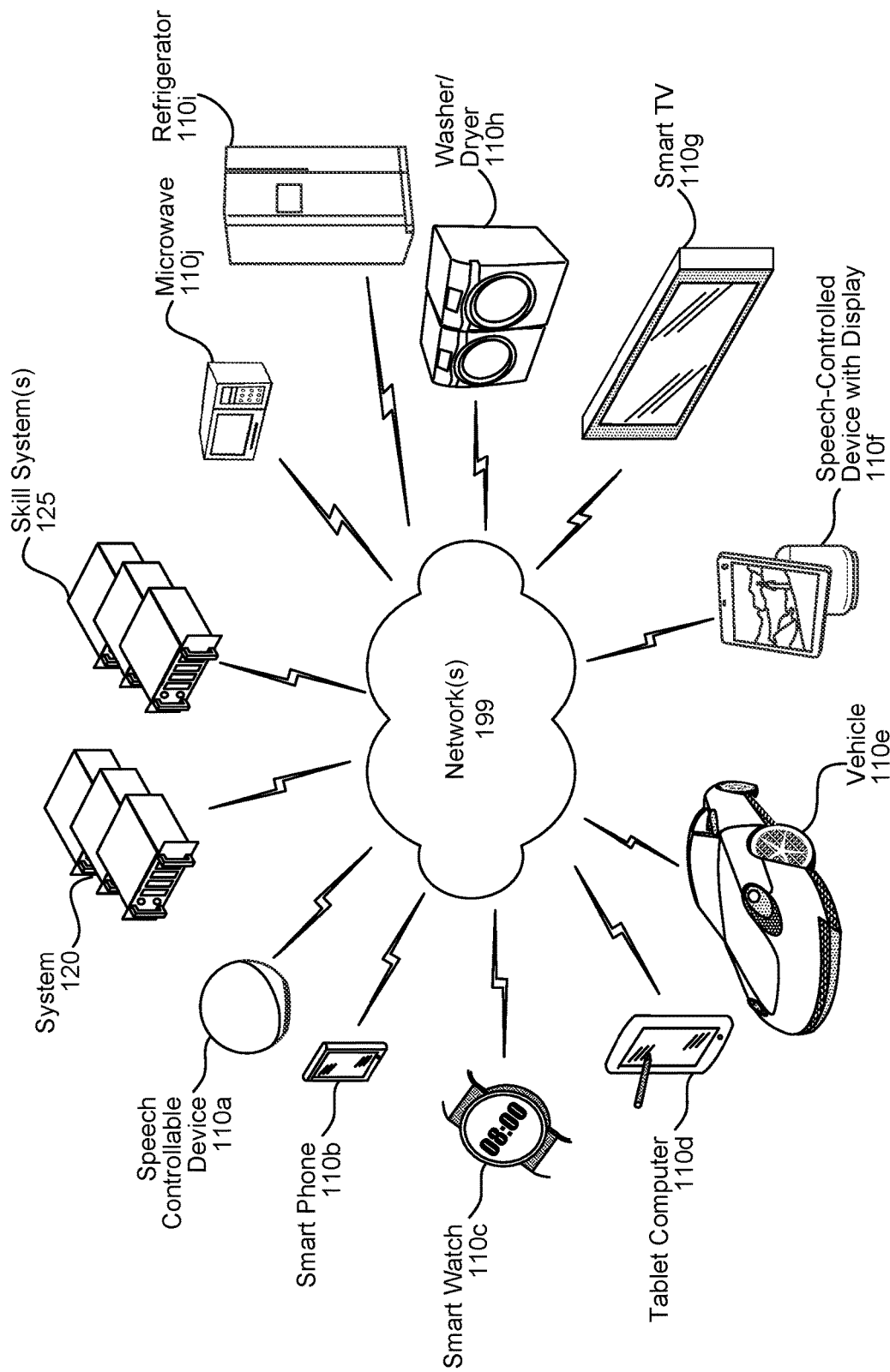
FIG. 9 illustrates an example of a computer network for use with the overall system, according to embodiments of the present disclosure.

As illustrated in FIG. 9, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first audio data representing a first spoken natural language input responsive to a prior system output;
determining, using the first audio data and automatic speech recognition (ASR) processing, first ASR output data;
selecting, based on the first spoken natural language input being responsive to the prior system output, a first generator model from among a plurality of generator models, wherein the first generator model is configured to convert a first natural language input corresponding to a first sentiment to a second natural language input corresponding to a second sentiment, wherein the first generator model changes a first portion of the first natural language input to generate the second natural language input;
processing the first ASR output data, corresponding to the first sentiment, using the first generator model to determine first text data representing a first machine-generated input corresponding to the second sentiment, wherein the first generator model receives the first ASR output data as the first natural language input and produces the first text data as the second natural language input;
determining, using the first ASR output data and the first text data, a second portion of the first ASR output data different than a third portion of the first text data, wherein the second portion causes the first spoken natural language input to be classified to the first sentiment;
based on determining the second portion, determining a first natural language output requesting feedback with respect to the prior system output;
determining, using the first natural language output and text-to-speech (TTS) processing, output audio data; and
causing a device to present the output audio data.

2. The computer-implemented method of claim 1, further comprising:
receiving second audio data representing a second spoken natural language input;
determining, using the second audio data and ASR processing, second ASR output data;
determining, using the second ASR output data, that the second natural language input corresponds to a first domain;
processing the second ASR output data using a second generator model to determine second text data representing a second machine-generated input corresponding to the first domain, wherein the second generator model is configured to convert a third natural language input corresponding to a second domain to a fourth natural language input corresponding to the first domain, wherein the second generator model changes a fourth portion of the third natural language input to generate the fourth natural language input, and wherein the second generator model receives the second ASR output data as the third natural language input and produces the second text data as the fourth natural language input;
determining that second ASR output data corresponds to the second text data; and
based on determining that the second ASR output data corresponds to the second text data, determining, using data corresponding to the first domain, output data responsive to the second spoken natural language input.

3. The computer-implemented method of claim 1, further comprising:
receiving second audio data representing a second spoken natural language input;
determining, using the second audio data and ASR processing, second ASR output data;
determining, using the second ASR output data, that the second spoken natural language input corresponds to a first domain;
processing the second ASR output data using a second generator model to determine second text data representing a second machine-generated input corresponding to a second domain, wherein the second generator model is configured to convert a third natural language input corresponding to the first domain to a fourth natural language input corresponding to the second domain, wherein the second generator model changes a fourth portion of the third natural language input to generate the fourth natural language input, and wherein the second generator model receives the second ASR output data as the third natural language input and produces the second text data as the fourth natural language input;
determining, using the second ASR output data and the second text data, at least a fifth portion of the second ASR output data different than a sixth portion of the second text data;
determining, using the fifth portion and the first domain, output data representing an explanation of processing performed with respect to the second spoken natural language input, the output data representing the fifth portion causing classification of the second spoken natural language input to the first domain; and
causing the output data to be presented in response to an input requesting the explanation.

4. The computer-implemented method of claim 1, further comprising:
receiving training data for a domain classification model configured to classify a third natural language input to a first domain, the training data including a first sample natural language input associated with a first label representing the first domain;
determining, using a second generator model and the first sample natural language input, a second sample natural language input, wherein the second generator model is configured to convert a third natural language input corresponding to a second domain to a fourth natural language input corresponding to the first domain by changing a third portion of the third natural language input to generate the fourth natural language input, the first domain being different than the second domain, and wherein the second generator model receives the first sample natural language input as the third natural language input and produces the second sample natural language input as the fourth natural language input;
determining a fourth portion of the first sample natural language input different than a fifth portion of the second sample natural language input; and
based on determining the fourth portion is different than the fifth portion, updating the first label to a second label representing a third domain different than the first domain.

5. A system comprising:
at least one processor; and
at least one memory including instructions that, when executed by the at least one processor, cause the system to:
receive first input data representing a first natural language input corresponding to a first classification;
determine, using a first model and the first input data, first machine-generated data corresponding to a second classification that is an alternative of the first classification, wherein the first model is configured to change a first portion of the first input data, corresponding to the first classification, to generate the first machine-generated data corresponding to the second classification;
based at least in part on processing the first input data with respect to the first machine-generated data, determine a second portion of the first input data that caused the first natural language input to be classified to the first classification; and
determine, using the second portion and the first classification, first output data representing at least the second portion.

6. The system of claim 5, wherein the first classification is a first sentiment and the second classification is a second sentiment, and wherein the at least one memory includes further instructions that, when executed by the at least one processor, further cause the system to:
select the first model from a plurality of models based on the first input data corresponding to the first sentiment.

7. The system of claim 5, wherein the first classification is a first intent and the second classification is a second intent, and wherein the at least one memory includes further instructions that, when executed by the at least one processor, further cause the system to:
select the first model from a plurality of models based on the first input data corresponding to the first intent.

8. The system of claim 5, wherein the at least one memory includes further instructions that, when executed by the at least one processor, further cause the system to:
receive audio data representing the first natural language input; and
perform automatic speech recognition (ASR) processing using the audio data to determine the first input data.

9. The system of claim 5, wherein the at least one memory includes further instructions that, when executed by the at least one processor, further cause the system to:
process the first input data with respect to the first machine-generated data to determine at least the second portion of the first input data different than at least a third portion of the first machine-generated data.

10. The system of claim 5, wherein the at least one memory includes further instructions that, when executed by the at least one processor, further cause the system to:
determine the first output data representing an explanation of processing performed with respect to the first natural language input based at least in part on the second portion and the first classification;
determine output audio data using the first output data and text-to-speech (TTS) processing; and
cause the output audio data to be presented in response to a second natural language input requesting the explanation of processing performed with respect to the first natural language input.

11. The system of claim 5, wherein the at least one memory includes further instructions that, when executed by the at least one processor, further cause the system to:
receive second input data representing a second natural language input corresponding to the first classification;
determine, using a second model and the second input data, second machine-generated data corresponding to the first classification, wherein the second model is configured to change a third portion of the second input data, corresponding to the second classification, to generate the second machine-generated data corresponding to the first classification;
based at least in part on processing the second input data with respect to the second machine-generated data, determine that the second input data corresponds to the first classification; and
determine, using data corresponding to the first classification, second output data responsive to the second natural language input.

12. The system of claim 5, wherein the first model is configured to convert an input corresponding to a positive or negative sentiment to an input corresponding to a neutral sentiment, and wherein the at least one memory includes further instructions that, when executed by the at least one processor, further cause the system to:
receive second input data representing a second natural language input;
determine, using the first model and the second input data, second machine-generated data corresponding to the neutral sentiment;
determine a fourth portion of the second input data different from a fifth portion of the second machine-generated data; and
determine, using the fourth portion, second output data requesting feedback with respect to processing of another prior natural language input.

13. The system of claim 5, wherein the at least one memory includes further instructions that, when executed by the at least one processor, further cause the system to:
receive second input data representing a second natural language input corresponding to a first domain;
determine, using a second model and the second input data, second machine-generated data corresponding to the first domain, wherein the second model is configured to change a third portion of the second input data, corresponding to a second domain, to generate the second machine-generated data corresponding to the first domain; and
based at least in part on processing the second input data with respect to the second machine-generated data, determine that the second input data corresponds to a domain different than the first domain.

14. A method performed by one or more processors executing instructions stored in one or more computer-readable mediums, the method comprising:
receiving first input data representing a first natural language input;
determining that the first input data corresponds to a first domain;
determining, using a first model and the first input data, first machine-generated data corresponding to the first domain, wherein the first model is configured to change a first portion of a first input, corresponding to a second domain, to generate a second input corresponding to the first domain, and wherein the first model receives the first input data as the first input and produces the first machine-generated data as the second input;

determining that the first input data corresponds to the first domain based at least in part on processing the first input data with respect to the first machine-generated data;

determining, using data associated with the first domain, first output data responsive to the first natural language input; and causing a device to provide an output corresponding to the first output data.

15. The method of claim 14, further comprising:

receiving second input data representing a second natural language input;

determining that the second input data corresponds to the first domain;

determining, using a second model and the second input data, second machine-generated data corresponding to the second domain, wherein the second model is configured to change a second portion of a third input, corresponding to the first domain, to generate a fourth input corresponding to the second domain, and wherein the second model receives the second input data as the third input and produces the second machine-generated data as the fourth input;

determining that the second input data corresponds to the second domain based at least in part on processing the second input data with respect to the second machine-generated data; and determining, using data associated with the second domain, second output data responsive to the second natural language input.

16. The method of claim 14, further comprising:

selecting the first model from a plurality of models based on the first input data corresponding to the first domain, wherein the plurality of models includes a second model configured to change a second portion of second input data, corresponding to a first sentiment, to generate second machine-generated data corresponding to a second sentiment.

17. The method of claim 14, further comprising:

receiving audio data representing the first natural language input; and processing the audio data using automatic speech recognition (ASR) processing to determine the first input data.

18. The method of claim 14, further comprising:

processing the first input data using the first model to determine the first machine-generated data;

processing the first input data with respect to the first machine-generated data to determine at least a second portion of the first input data different than at least a third portion of the first machine-generated data; and determining, based on determining the second portion, that the first input data corresponds to the second domain.

19. The method of claim 14, further comprising:

processing the first input data with respect to the first machine-generated data to determine at least a second portion of the first input data different than at least a third portion of the first machine-generated data; and determining, using the second portion and the second domain, second output data responsive to an input requesting an explanation of processing performed with respect to the first natural language input.

20. The method of claim 14, further comprising:

receiving second input data representing a second natural language input;

determining that the second input data corresponds to the first domain;

determining, using the first model and the second input data, second machine-generated data corresponding to the first domain;

determining that the second input data corresponds to the second domain based at least in part on processing the second input data with respect to the second machine-generated data; and determining, using data associated with the second domain, second output data responsive to the first natural language input.

* * * * *